United States Patent
Iwatake

(10) Patent No.: US 10,423,154 B2
(45) Date of Patent: Sep. 24, 2019

(54) ROBOT SYSTEM INCLUDING FORCE-CONTROLLED PUSHING DEVICE

(71) Applicant: FANUC CORPORATION, Yamanashi (JP)

(72) Inventor: Takahiro Iwatake, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/877,505

(22) Filed: Jan. 23, 2018

(65) Prior Publication Data

US 2018/0210434 A1    Jul. 26, 2018

(30) Foreign Application Priority Data

Jan. 24, 2017 (JP) .................. 2017-010658

(51) Int. Cl.
| | |
|---|---|
| *G05B 19/423* | (2006.01) |
| *B25J 9/16* | (2006.01) |
| *B25J 13/08* | (2006.01) |
| *B25J 9/00* | (2006.01) |

(52) U.S. Cl.
CPC .......... *G05B 19/423* (2013.01); *B25J 9/0081* (2013.01); *B25J 9/1656* (2013.01); *B25J 13/08* (2013.01); *B25J 13/085* (2013.01); *G05B 2219/36429* (2013.01)

(58) Field of Classification Search
CPC ......... G05B 19/423; G05B 2219/36429; B25J 13/08; B25J 9/1656
See application file for complete search history.

(56) References Cited

U.S. PATENT DOCUMENTS

| | | | | |
|---|---|---|---|---|
| 2011/0257787 A1* | 10/2011 | Sato | ....................... | B25J 9/1633 |
| | | | | 700/258 |
| 2015/0290810 A1* | 10/2015 | Iwatake | ................. | B25J 9/1694 |
| | | | | 700/258 |

FOREIGN PATENT DOCUMENTS

| | | |
|---|---|---|
| CN | 105643641 A | 6/2016 |
| CN | 106335053 A | 1/2017 |
| JP | S59157715 A | 9/1984 |
| JP | S60124706 A | 7/1985 |
| JP | S63288659 A | 11/1988 |
| JP | H6-214633 A | 8/1994 |
| JP | 2002-52485 A | 2/2002 |

(Continued)

*Primary Examiner* — Kawing Chan
*Assistant Examiner* — Bradley R Brown
(74) *Attorney, Agent, or Firm* — Hauptman Ham, LLP

(57) ABSTRACT

A robot system including a force-controlled pushing device which causes, when a robot is guided and moved, an object provided at a tip end of the robot to be brought into appropriate contact with another object. The robot system includes the robot, the force-controlled pushing device, a robot operation input measuring part, a robot movement command calculating part, a pushing direction setting part, a target pushing force setting part, a force measuring part, and a force-controlled pushing device movement command calculating part. The pushing direction setting part sets a pushing direction of the force-controlled pushing device, based on at least one of: the position/orientation of the first object; a force-controlled pushing device movement command for moving the first object; the position/orientation of the movement mechanism part of the force-controlled pushing device; the position/orientation of the robot; and a robot movement command for moving the robot.

14 Claims, 7 Drawing Sheets

(56) References Cited

FOREIGN PATENT DOCUMENTS

| | | |
|---|---|---|
| JP | 2012-157946 A | 8/2012 |
| JP | 2014-40001 A | 3/2014 |
| JP | 2015-134407 A | 7/2015 |

\* cited by examiner

ROBOT SYSTEM INCLUDING FORCE-CONTROLLED PUSHING DEVICE

RELATED APPLICATIONS

The present application claims priority to Japanese Patent Application Number 2017-010658, filed Jan. 24, 2017, the disclosure of which is hereby incorporated by reference herein in its entirety.

BACKGROUND OF THE INVENTION

1. Field of the Invention

The present invention relates to a robot system which controls a force acting between a tool and a workpiece and which causes the tool and the workpiece to move relative to each other.

2. Description of the Related Art

A method, known as direct teaching (direct teach), in which forces are applied to a robot via links and a tip end, which constitute the robot, to move the robot, has been widely known.

As a conventional technique related to this method, a method for directly teaching a robot based on output signals of a force sensor has been known (see, for example, JP S59-157715 A or JP S63-288659 A). Further, a method for directly teaching a robot based on outputs of a direction sensor has been known (see, for example, JP S60-124706 A).

In the case where a force acting on a tip end of a robot is set to be an object to be detected, and when an operator applies a force to the tip end of the robot, a force control operation, which balances the force applied by the operator with a force acting between a tool and a workpiece, causes the force acting between the tool and the workpiece, when the operator moves the robot, to correspond to a target force, it is difficult to move the robot so that the tool comes into appropriate contact with the workpiece, because visual contact or human sense of pushing is used to cause the tool to follow the outline of the workpiece as accurately as possible. Further, if the outline of the workpiece is complicated, when the tool and the workpiece move relative to each other, the tip end of the robot may be moved in a direction that does not follow the outline of the workpiece, or the tool may not appropriately contact the workpiece (for example, the tool and the workpiece may move away from each other, and, in contrast, they may interfere with each other). Thus, it is difficult to prevent the tool from being detached from the workpiece, and to cause the tool to accurately follow the outline of the workpiece by an appropriate force. When an operating part in the tip end of the robot is away from a contact point between the workpiece and the tool, it is extremely difficult to cause the tool to accurately follow the outline of the workpiece.

When a robot is moved by measuring a net force applied to the robot including links, a tip end, a handle, etc., or by, for example, a non-contact motion teaching device, if a force acting between a tool and a workpiece cannot be measured, it is possible to move the robot so that the tool and the workpiece move closer to each other to some extent by directly viewing them or viewing an image captured by a camera. However, it is extremely difficult to move the tool and the workpiece relative to each other while they are in contact with each other by an appropriate force.

SUMMARY OF THE INVENTION

An aspect of this disclosure provides a robot system for causing a robot and a force-controlled pushing device provided at a tip end of the robot to control a force acting between a tool and a workpiece, so as to move the tool and the workpiece relative to each other. The robot system includes: the robot; the force-controlled pushing device comprising a movement mechanism part, which holds a first object, i.e., one of the tool and the workpiece, and moves the first object by controlling a force acting between the first object and a second object, i.e., the other of the tool and the workpiece, so as to push the first object, in a predetermined pushing direction, by a predetermined target pushing force; a robot operation input measuring part for measuring a robot operation input for moving/operating the robot; a robot movement command calculating part for calculating, based on the robot operation input measured by the robot operation input measuring part, a robot movement command, i.e., a movement command for the robot; a force-controlled pushing device's pushing direction setting part for setting the pushing direction of the force-controlled pushing device; a force-controlled pushing device's target pushing force setting part for setting the target pushing force of the force-controlled pushing device; a force-controlled pushing device's force measuring part for measuring a force acting between the tool and the workpiece; and a force-controlled pushing device movement command calculating part for calculating, based on the pushing direction set by the force-controlled pushing device's pushing direction setting part, the target pushing force set by the force-controlled pushing device's target pushing force setting part, and a force measured by the force-controlled pushing device's force measuring part, a force-controlled pushing device movement command, i.e., a movement command for the movement mechanism part of the force-controlled pushing device. The force-controlled pushing device's pushing direction setting part sets a pushing direction of the force-controlled pushing device, based on at least one of the position, orientation, or position and orientation of the first object, the force-controlled pushing device movement command for moving the first object, the position, orientation, or position and orientation of the movement mechanism part of the force-controlled pushing device, the position, orientation, or position and orientation of the robot, or the robot movement command for moving the robot.

Another aspect of this disclosure provides a robot system for causing a robot and a force-controlled pushing device provided at the tip end of the robot to control a force acting between a tool and a workpiece, so as to move the tool and the workpiece relative to each other. The robot system includes: the robot; the force-controlled pushing device comprising a movement mechanism part, which holds a first object, i.e., one of the tool and the workpiece, and moves the first object by controlling a force acting between the first object and a second object, i.e., the other of the tool and the workpiece, so as to push the first object, in a predetermined pushing direction, by a predetermined target pushing force; a robot operation input measuring part for measuring a robot operation input for moving/operating the robot; a robot movement command calculating part for calculating, based on the robot operation input measured by the robot operation input measuring part, a robot movement command, i.e., a movement command for the robot; a force-controlled pushing device's pushing direction setting part for setting the pushing direction of the force-controlled pushing device; a force-controlled pushing device's target pushing force setting part for setting the target pushing force of the force-controlled pushing device; a force-controlled pushing device's force measuring part for measuring a force acting between the tool and the workpiece; and a force-controlled pushing device movement command calculating part for calculating, based on the pushing direction set by the force-controlled pushing device's pushing direction setting part, the target pushing force set by the force-controlled pushing device's target pushing force setting part, and a force measured by the force-controlled pushing device's force measuring part, a force-controlled pushing device movement command, i.e., a movement command for the movement mechanism part of the force-controlled pushing device. The robot movement command calculating part adjusts the amount of movement in the robot movement command, or prevents the robot from moving, based on at least one of the position, orientation, or position and orientation of in an operable range of the movement mechanism part of the force-controlled pushing device, the pushing direction set by the force-controlled pushing device's pushing direction setting part, or a force measured by the force-controlled pushing device's force measuring part.

BRIEF DESCRIPTION OF THE DRAWINGS

The above and other objects, features and advantages of the present invention will be made more apparent by the following description, of the preferred embodiments thereof, with reference to the accompanying drawings wherein.

DETAILED DESCRIPTION

Figure 1:
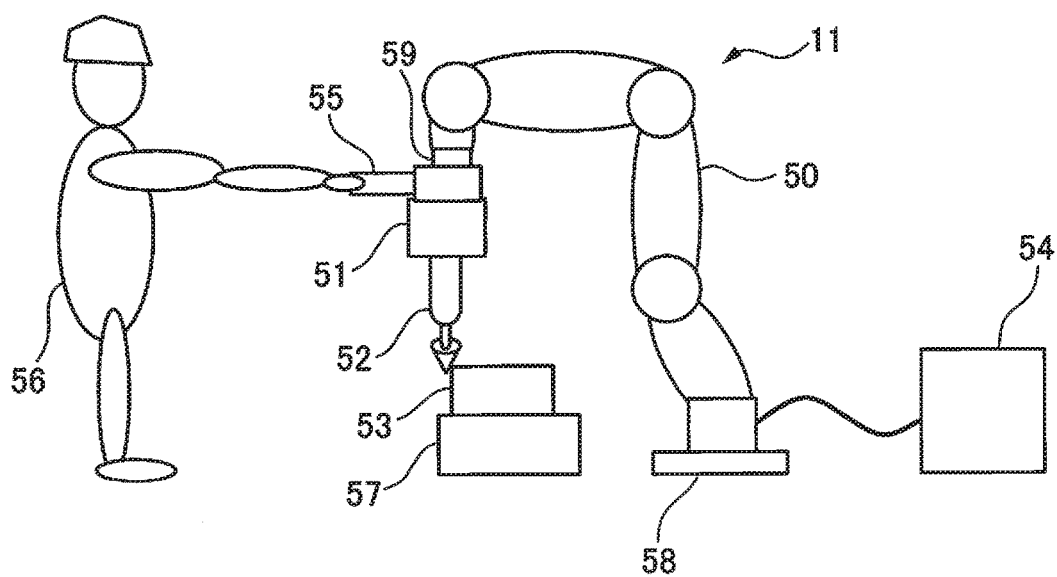
FIG. 1 is a view of a schematic configuration of a robot system according to an embodiment of this disclosure.

Embodiments of this disclosure will be described below with reference to the accompanying drawings. In the following figures, similar members are designated with the same reference numerals. These figures are properly modified in scale to assist the understanding thereof.

In the following description, unless otherwise specified, "force" includes a translation-direction component of force and a moment component of force. Further, "position and/or orientation" represents "position or orientation", or "position and orientation".

FIG. 1 is a schematic view of a configuration example of a robot system 11 including a force-controlled pushing device according to an embodiment of this disclosure. The robot system 11 includes a robot 50, a force-controlled pushing device 51 attached to the tip end of the robot 50, and a controller 54 for the robot and the force-controlled pushing device. One of a tool 52 held by the force-controlled pushing device 51 and a workpiece 53 is set as a first object, and the other of the tool 52 and the workpiece 53 is set as a second object.

A robot guidance device 55 for guiding, moving, and operating the robot 50, the force-controlled pushing device 51, and the tool 52 are attached to the tip end of the robot 50. The workpiece 53 is placed on a working table 57.

In the robot system 11, an operator 56 guides, moves, and operates the robot 50 by operating the robot guidance device 55. In this respect, the robot 50 and the force-controlled pushing device 51 provided at the tip end of the robot 50 control a force acting between the tool 52 and the workpiece 53, so as to move the tool 52 and the workpiece 53 relative to each other.

In this embodiment, the system reference coordinate system is an orthogonal coordinate system which is set with respect to the robot system 11 and which represents the position and/or orientation of the robot 50, the position and/or orientation of a mechanism part of the force-controlled pushing device 51, the position and/or orientation of the first object, the position and/or orientation of the second object, etc.

The position and/or orientation in the operable range of a movement mechanism part of the force-controlled pushing device 51 means the position and/or orientation of a first object holding portion of the movement mechanism part of the force-controlled pushing device 51 with respect to the force-controlled pushing device 51. Further, the position and/or orientation of the movement mechanism part of the force-controlled pushing device 51 means, unless otherwise specified, the position and/or orientation of the movement mechanism part of the force-controlled pushing device 51 in the system reference coordinate system, or the position and/or orientation in the operable range of the movement mechanism part of the force-controlled pushing device 51.

The robot 50 and the force-controlled pushing device 51 are each provided with a movement mechanism part and a driving part for the movement mechanism part. The controller 54 for the robot and the force-controlled pushing device controls the driving parts at every control cycle, so as to move the robot 50 and the force-controlled pushing device 51.

The controller 54 for the robot and the force-controlled pushing device has a hardware configuration including an arithmetic processing unit, a ROM, a RAM, etc., and performs various functions that will be described later.

The controller for controlling the robot 50 and the force-controlled pushing device 51 may be comprised of separate controllers but not a single controller in this embodiment, and, in this case, the controller for the robot 50 and the controller for the force-controlled pushing device 51 may be adapted to communicate with each other. Alternatively, the controller for the robot 50 may be provided separately from the robot 50, or may be incorporated in the robot 50. Alternatively, the controller for the force-controlled pushing device 51 may be provided separately from the force-controlled pushing device 51, or may be incorporated in the force-controlled pushing device 51. Alternatively, the controller 54 for the robot and the force-controlled pushing device or the separate controllers for the robot 50 and the force-controlled pushing device 51 may be connected to a network, and may communicate with and receive an input from another controller connected to the network.

In this embodiment, the robot 50 is a 6-axis vertical articulated robot. However, the robot 50 may be any known robot having another configuration, such as a multi-axis vertical articulated robot other than the 6-axis robot, a horizontal articulated robot, a parallel link robot, etc. The robot 50 has a mechanism part including a driving part for driving the robot 50 or links and joints which constitute the robot 50.

The tip end of the robot 50 is located on the tip end side of the robot 50 when viewed from a robot seat 58 on which the robot 50 is provided, and is a portion at which an object attached to a flange 59 of the robot 50 is present.

The working table 57 is only required to place the workpiece 53 thereon, and may be a stationary working table, or a movable working table which can be moved by a movement mechanism part having one axis or multiple axes. The working table 57 may be, for example, a machine provided with a movement mechanism part for changing position and/or orientation, such as another robot, a positioner, an AGV (Automatic Guided Vehicle), etc. The workpiece 53 may be placed on this machine.

The robot seat 58 is a seat for placing the robot 50 thereon, and is only required to place the robot 50 thereon. The robot seat 58 may be a stationary seat, or a movable seat which can be moved by a movement mechanism part having one axis or multiple axes. The robot seat 58 may be, for example, a machine provided with a movement mechanism part for changing position and/or orientation, such as another robot, a positioner, an AGV (Automatic Guided Vehicle), etc. The workpiece 53 may be placed on this machine. Note that, when a large change is made in the position of the robot 50, it is preferable that the controller 54 for the robot and the force-controlled pushing device is moved along with the robot 50.

The force-controlled pushing device 51 holds a first object, i.e., one of the tool 52 and the workpiece 53, and is provided with a movement mechanism part which controls a force acting between the tool 52 and the workpiece 53 so as to push the held first object, in a predetermined pushing direction, by a predetermined target pushing force, in order to move the first object held by the force-controlled pushing device 51. As the movement mechanism part of the force-controlled pushing device 51, any mechanism, in which the movement of the movement mechanism part can change the position and/or orientation of the first object held by the force-controlled pushing device 51, can be adopted. The reference position and/or orientation of the force-controlled pushing device 51 is set to be the center of the operable range of the movement mechanism part of the force-controlled pushing device 51, but may be predetermined position and/or orientation, which are used as criteria in the operable range of the movement mechanism part of the force-controlled pushing device 51. Note that the reference position and/or orientation do not have to be the center of the operable range of the force-controlled pushing device 51, and are preferably set to be the position and/or orientation, in which a manageable deviation in the position and/or orientation until the first object comes into contact with the second object can be set to be as large as possible. The movement mechanism part of the force-controlled pushing device 51 has a force control mode for controlling a force acting between the first object and the second object, and a position control mode for moving the first and second objects to the instructed position and/or orientation. When the force control mode is not used to move the force-controlled pushing device 51, the position control mode is used. When the robot 50 is moved without control of force acting between the first object and the second object, it is preferable that the movement mechanism part of the force-controlled pushing device 51 is set in the position control mode, and is fixed at the reference position and/or orientation, such as the center of the operable range. It is preferable that the movement mechanism part is fixed, when being set in the position control mode, at predetermined position and/or orientation to be determined depending on the interference with peripheral equipment or the state of the robot system 11. Further, the use of the force-controlled pushing device 51 provided with a movement mechanism part having responsiveness or operation performance better than the robot 50 enables the accuracy in the position and/or orientation, and locus of the first object to be improved, and enables a desired movement to be achieved, by moving the force-controlled pushing device 51 in the position control mode when the robot 50 stops, or by moving the force-controlled pushing device 51 so as to correct the movement of the robot 50 when moving the robot 50 as well as the force-controlled pushing device 51 in the position control mode.

It is preferable that the movement mechanism part of the force-controlled pushing device 51 is moved by a driving part comprised of an electric motor, a pneumatic or hydraulic actuator, etc., and has one or multiple degrees of freedom. In this embodiment, the mechanism part, which is driven by an electric motor and which moves in the axial directions of two perpendicular axes, or the mechanism part, which moves in the axial directions of two perpendicular axes and around each of the two axes, is provided. However, any actuator or a movement mechanism part having any degrees of freedom may be provided. In the force-controlled pushing device 51, a 6-axis force sensor or a force sensor having necessary degrees of freedom for detecting a force in the direction to be controlled, which measures a force acting between the first object held by the force-controlled pushing device 51 and the second object, i.e., the other of the tool 52 and the workpiece 53, is provided. Alternatively, the force may be obtained by measuring a current value of the electric motor for driving the force-controlled pushing device 51, and then, calculating the force acting between the tool 52 and the workpiece 53 based on the measured current value. Alternatively, the force may be obtained by measuring a difference between the movement command of the force-controlled pushing device 51 and the actual position, and then, calculating the force acting between the tool 52 and the workpiece 53 based on the measured value.

The force-controlled pushing device 51 is controlled by the controller 54 for the robot and the force-controlled pushing device, or may be controlled by the controller for the force-controlled pushing device 51. When the controller for the force-controlled pushing device 51 is not integral with the controller for the robot 50, the movement mechanism part may be moved based on commands for pushing directions, target pushing forces, the effectiveness/ineffectiveness of force control, and position control to be performed when force control is ineffective, a halt command, etc., which have been received from the controller for the robot 50. Alternatively, the force-controlled pushing device 51 may include a controller for controlling the force-controlled pushing device 51 inside the mechanism part of the force-controlled pushing device 51.

Figure 3:
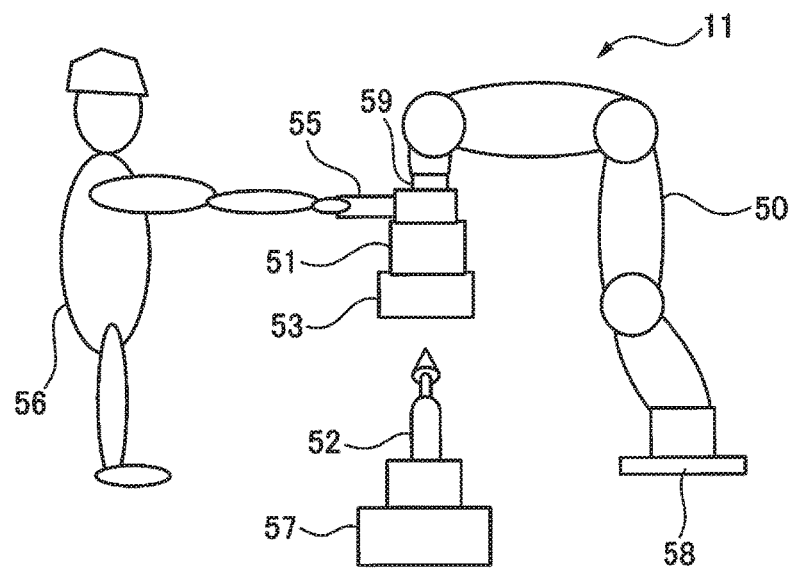
FIG. 3 is a view of a schematic configuration of a robot system according to another embodiment of this disclosure.

The tool 52 is attached to and held by the force-controlled pushing device 51. Alternatively, in the force-controlled pushing device 51, the tool 52 may be held by an openable and closable hand. The robot system 11 shown in FIG. 1 is configured so that the force-controlled pushing device 51 holds the tool 52, and brings the tool 52 into contact with the workpiece 53 placed on the working table 57. However, as in the robot system 11 shown in FIG. 3, the robot system may be configured so that the force-controlled pushing device 51 holds the workpiece 53, and the tool 52 is placed on the working table 57.

It is preferable that the force-controlled pushing device 51 is independent from components, which constitute the robot 50, and is detachably attached to the robot 50. This enables the force-controlled pushing device 51 to be detached and replaced with another device when replacement of the force-controlled pushing device 51 is needed for adjustment, maintenance, troubleshooting, etc.

In general, in the movement mechanism part of the force-controlled pushing device 51, it is easy to improve force control capabilities, such as a response in performance to a change in a target pushing force, stability, vibration damping, etc., so that they are better than the force control capabilities of the robot 50. Attaching the force-controlled pushing device 51, which has force control capabilities better than those of the robot 50, to the robot 50 enables the force acting between the tool 52 and the workpiece 53 to be more appropriately controlled. Thus, even when the responsiveness or operation performance of the force control or the position control of the robot 50 is not appropriate, the use of the force-controlled pushing device 51 having better responsiveness or operation performance of the force control or the position control enables the force acting between the first object and the second object to be rapidly and stably controlled. Further, the use of the force-controlled pushing device 51, which can be easily attached to and detached from the robot 50, can reduce the cost of the entirety of the robot system 11, if the force-controlled pushing device 51 is used, when it is needed, in a first robot system 11, and the force-controlled pushing device 51 is used in a second robot system 11 when it is not needed in the first robot system 11. Further, in general, when a machine or device having a movement mechanism part is moved at a high speed, the time interval for maintenance is short. However, if the force-controlled pushing device 51, which can be attached to and detached from the robot 50, is used, it is only required, for maintenance, to periodically remove only the force-controlled pushing device 51 to be moved rapidly. Further, when the robot 50 controls the force acting between the first object and the second object, it is necessary to move the entirety of the robot 50. However, when the force-controlled pushing device 51 is used, it is only required to move only an essential part, i.e., a mechanism part. Thus, more rapid movement can be achieved in comparison with the case where the entirety of the robot 50 is moved, and a load applied to the movement mechanism part can be reduced, and accordingly, the time interval for maintenance of the device can be increased. When the fact that, for example, a predetermined surface of the first object is brought into contact with a predetermined surface of the second object is achieved by moving the robot 50, it is necessary to move a plurality of axes. Thus, the use of the force-controlled pushing device 51 causes the aforementioned effect to be remarkable.

Figure 6:
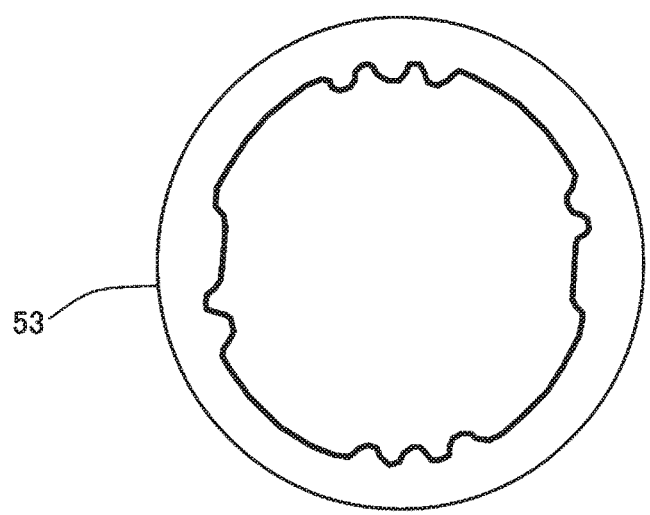
FIG. 6 is a view of an example of a workpiece included in the robot system according to an embodiment of this disclosure.

The tool 52 is a machining tool for, for example, burring, chamfering, polishing, grinding, and cutting the workpiece 53. Alternatively, the tool 52 may be a measuring tool, which includes a rotation mechanism for measuring a shape while following the outline of the workpiece 53 or which is an article e.g., a bar to be brought into contact with the workpiece 53, or may be a tool for guiding a guide member along the workpiece 53, to generate a teaching orbit of the robot 50. The workpiece 53 is an object to be operated, with which the tool 52 is brought into contact by a predetermined target pushing force. The workpiece 53 has, for example, the shape shown in FIG. 6 when viewed from the top surface of the workpiece, and its inner shape is followed by the tool 52.

If the tool 52 is heavy, the tool 52 may be held, at the tip end of the robot 50, by the force-controlled pushing device 51, and may be moved by the movement of the robot 50. Alternatively, if the workpiece 53 is heavy, the workpiece 53 may be held, at the tip end of the robot 50, by the force-controlled pushing device 51, and may be moved by the movement of the robot 50. Alternatively, the tool 52 may be an object intended to be brought into contact with the workpiece 53, in order to obtain the shape of the workpiece by following the outline of the workpiece. In order to, for example, teach a certain orbit, when a guide member, such as a mold or frame, which has a certain shape or a shape that can be easily changed, is used as a workpiece 53, and an object which is brought into contact with the workpiece 53 is used as a tool 52, a teaching orbit, along which the robot 50 moves, may be generated from the movement of the tip end of the robot 50 when the tool 52 follows the outline of the workpiece 53, the position and/or orientation of the object attached to the tip end of the robot 50, the position and/or orientation of the force-controlled pushing device 51, or the contact point between the tool 52 and the workpiece 53.

The operator 56 gives a robot operation input for moving the robot 50, using a given movement operation device, so as to move the robot 50. In this embodiment, the robot guidance device 55 for guiding, moving, and operating the robot 50 is used to move the robot 50. It is preferable that the robot guidance device 55 is a handle having a shape that can be easily operated by the operator 56, and is provided with an input device or output device if necessary. It is preferable that the output device of the robot guidance device 55 is, for example, an image output device or indication light device for displaying images, such as characters, numerical values, colors, pictures, codes, graphics, patterns, etc., a sound output device for outputting sounds, a vibration output device for providing/outputting vibrations, or a sense presenting device for providing tactile sense or smell, and wind to the operator 56.

As shown in FIG. 1, the robot guidance device 55 is attached to the tip end of the robot 50, and an operation input of the robot 50, which is used for moving and operating the robot 50, is measured by measuring a force applied from the operator 56 to the robot guidance device 55, so as to move and operate the robot 50. In this respect, it is preferable that, in order to measure a net force applied by the operator 56, a force applied by, for example, the gravitational force or inertia force of another object is compensated when needed.

Figure 4:
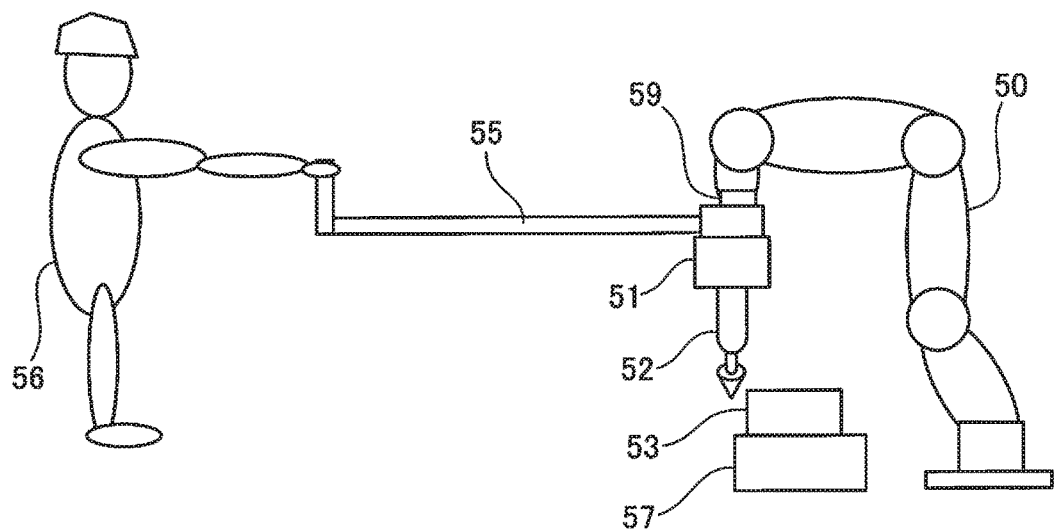
FIG. 4 is a view of a schematic configuration of a robot system according to still another embodiment of this disclosure.

Alternatively, as in another embodiment of the robot system 11 shown in FIG. 4, the robot guidance device 55 may be configured to improve the safety of the operator 56 by increasing the distance between the operator 56 and the robot 50.

Figure 5:
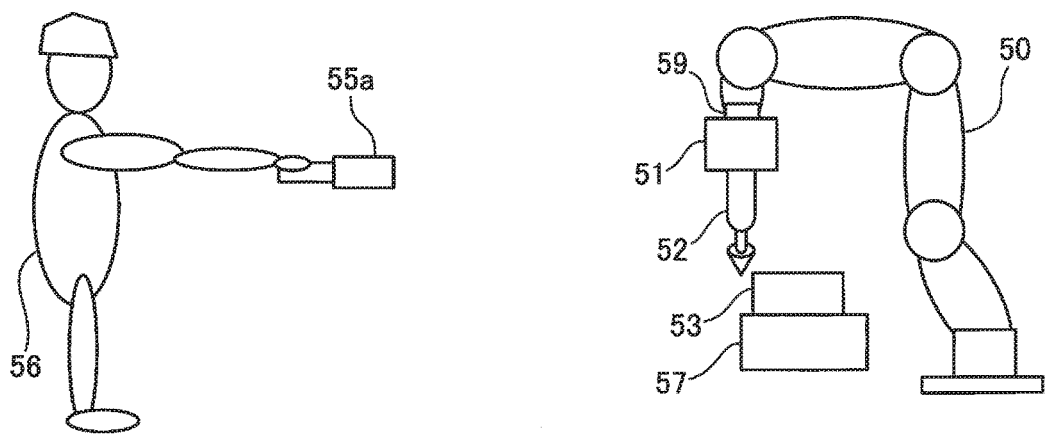
FIG. 5 is a view of a schematic configuration of a robot system according to still another embodiment of this disclosure.

Alternatively, as in another embodiment of the robot system 11 shown in FIG. 5, the robot 50 may be moved and operated by replacing the robot guidance device 55 with a non-contact input device, i.e., a non-contact robot guidance device 55*a*, and measuring an input received by the robot guidance device 55*a*, so as to measure an operation input of the robot 50, which is used to move and operate the robot 50. The robot 50 may be moved/operated by, for example, using the robot guidance device 55 as a non-contact input device, which inputs position, orientation, moving direction, speed, acceleration, etc., by measuring the inclination or movement of the input device using an inertial sensor, such as an acceleration sensor or gyro sensor, magnetic sensor, etc., or by measuring the movement of the operator 56 or the movement/operation of the input device using laser, infrared light, or a camera, so as to measure an operation input for moving/operating the robot 50 without contacting the robot 50. Alternatively, the robot 50 may be moved/operated by direct teach (which means, hereinafter, direct teaching) for moving the robot 50 depending on the force applied from the operator 56 to the tip end of the robot 50. Alternatively, the robot 50 may be moved/operated by direct teach for moving the robot 50 depending on the force applied from the operator 56 to a main body portion of the robot 50, including links and joints, which constitute the robot 50.

Figure 2:
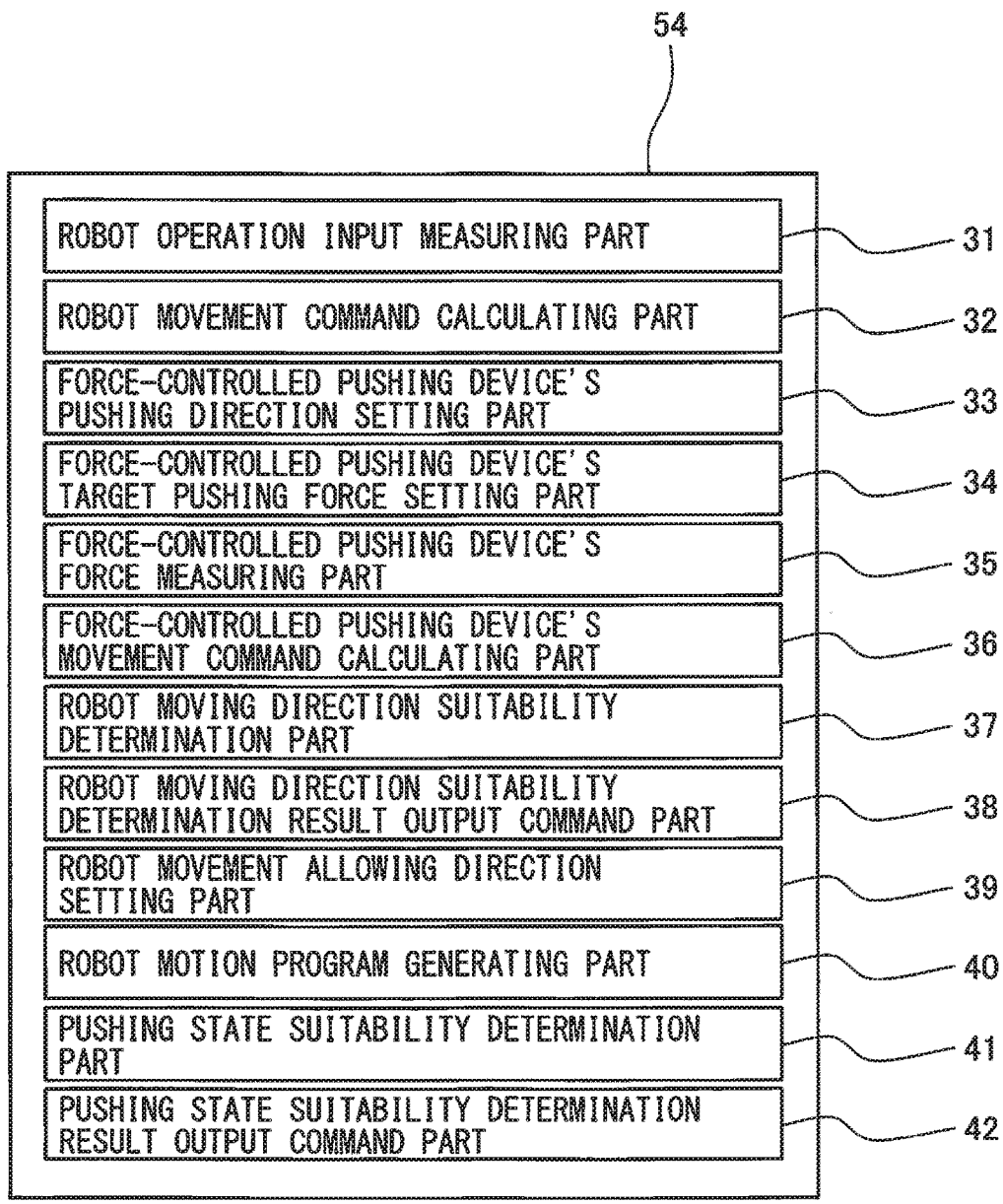
FIG. 2 is a view functionally representing a configuration of a controller for a robot and a force-controlled pushing device, which are provided in the robot system according to an embodiment of this disclosure.

FIG. 2 is a view functionally showing a configuration of the controller 54 for the robot and the force-controlled pushing device according to a first embodiment of this disclosure. As shown in FIG. 2, the controller 54 for the robot and the force-controlled pushing device includes functions, such as a robot operation input measuring part 31, a robot movement command calculating part 32, a force-controlled pushing device's pushing direction setting part 33, a force-controlled pushing device's target pushing force setting part 34, a force-controlled pushing device's force measuring part 35, a force-controlled pushing device movement command calculating part 36, a robot moving direction suitability determination part 37, a robot moving direction suitability determination result output command part 38, a robot movement allowing direction setting part 39, a robot motion program generating part 40, a pushing state suitability determination part 41, a pushing state suitability determination result output command part 42, etc., which will be described later. Although not illustrated in FIG. 2, the controller 54 for the robot and the force-controlled pushing device includes other necessary functions, such as a storage part, an arithmetic part, a data communication part, a signal input part, a signal output part, etc., which are necessary for realizing various functions.

When separate controllers are used as the controller for controlling the robot 50 and the force-controlled pushing device 51, the controllers may share the aforementioned functions. For example, the controller for the robot 50 may include the robot operation input measuring part 31, the robot movement command calculating part 32, the force-controlled pushing device's pushing direction setting part 33, the force-controlled pushing device's target pushing force setting part 34, the robot moving direction suitability determination part 37, the robot moving direction suitability determination result output command part 38, the robot movement allowing direction setting part 39, and the robot motion program generating part 40, and the controller for the force-controlled pushing device 51 may include the force-controlled pushing device's force measuring part 35, the force-controlled pushing device movement command calculating part 36, the pushing state suitability determination part 41, and the pushing state suitability determination result output command part 42.

The robot operation input measuring part 31 measures a robot operation input for moving/operating the robot 50. In order to move/operate the robot 50, the operator 56 gives a robot operation input by applying a force to the robot 50, or giving an input using a contact or non-contact input means, and the robot operation input measuring part 31 measures the robot operation input.

In a first embodiment, the robot operation input measuring part 31 measures, as an operation input for moving/operating the robot 50, a force applied from the operator 56 to the robot guidance device 55. However, regarding the robot operation input for moving/operating the robot 50, any state, which can be changed by the operation of the operator 56, may be set as the robot operation input, and the robot operation input may be measured by measuring such a state. It is preferable that the method for the operation input for moving the robot 50 is determined taking the configuration of the robot system 11 into consideration.

The robot operation input measuring part 31 may measure a force applied to the main body portion of the robot 50, may measure a force applied to the tip end of the robot 50, or may measure a force applied to the robot guidance device 55 attached to the robot 50. In this respect, if a sensor is used when the robot operation input measuring part 31 measures a force, examples of the sensor include any sensors, which can measure a force applied to an object, such as a distortion gauge-type sensor, a capacitance sensor, a piezoelectric sensor, a sensor using a piezoelectric effect of a crystal, an optical sensor, a magnetic sensor, etc. Further, the sensor used for measuring a force may be provided at a given place, such as a joint of the robot 50, the main body portion of the robot 50, the seat 58 of the robot 50, or the tip end of the robot 50. Alternatively, when an actuator for driving the robot 50 is, for example, an electric motor driven by electric current, the robot operation input measuring part 31 may estimate and measure a force from the value of the current. Alternatively, the robot operation input measuring part 31 may estimate and measure a force from a difference between the value of a movement command for the robot 50 and the actual position. When the robot operation input measuring part 31 is set to be able to measure a force applied to the tip end of the robot 50, the comparison between the force measured by the robot operation input measuring part 31 and the force measured by the force-controlled pushing device's force measuring part 35 enables a determination of, for example, whether the difference between the value measured by the robot operation input measuring part 31 and the value measured by the force-controlled pushing device's force measuring part 35 is large, whether the value measured by one of these measuring parts is abnormal, or whether a device, such as a sensor used to measure/estimate a force breaks down.

Alternatively, the robot operation input measuring part 31 may measure, as a robot operation input for moving/operating the robot 50, an input given by a non-contact input means which does not contact the robot 50.

For example, the robot operation input measuring part 31 may measure the robot operation input by measuring the position, orientation, moving direction, speed, acceleration, etc. of the non-contact input device by measuring the inclination or movement of the input device using an inertial sensor, such as an acceleration sensor or gyro sensor, a magnetic sensor, etc., or by measuring the movement of the operator or the movement/motion of the input device.

Alternatively, the robot operation input measuring part 31 may measure, as the robot operation input, the motion of the operator 56 by a camera or a sensing device using a motion-capture technology, which is provided on the robot 50, the seat 58 of the robot 50, the tip end of the robot 50, the force-controlled pushing device 51, the tool 52, the workpiece 53, or another portion away from these portions, such as a ceiling, a floor, a wall, a surrounding portion, etc. Alternatively, the robot operation input measuring part 31 may measure, as the robot operation input, an input given by a device for teaching/operating the robot 50.

The robot movement command calculating part 32 calculates a robot movement command, i.e., a movement command for the robot 50 based on the robot operation input measured by the robot operation input measuring part 31. The robot movement command calculating part 32 calculates a robot movement command depending on a robot operation input by performing a predetermined arithmetic processing: e.g., multiplying the robot operation input, which is measured by the robot operation input measuring part 31, by a predetermined factor; obtaining an output by assigning the value of the robot operation input to a predetermined relational expression; saturating the robot operation input by another given value; or smoothing the robot operation input to smooth the value. The predetermined factor or predetermined relational expression, the value to be saturated, etc. may be changed depending on the situation.

Further, it is preferable that the robot movement command calculated at this time is adjusted so as to adjust the size of the robot, to stop the robot, and to move the robot in an escaping direction when, for example, a collision is detected, based on an input signal from the outside, an input given by the operator 56, the occurrence of problems such as troubles in the force-controlled pushing device 51 and the robot 50, and movement conditions including the moving direction of the force-controlled pushing device 51 in the system reference frame, the moving direction in the movement mechanism part of the force-controlled pushing device 51, the force measured by the force-controlled pushing device's force measuring part 35, the position and/or orientation of the movement mechanism part of the force-controlled pushing device 51 in the system reference coordinate system, the position and/or orientation in the operable range of the movement mechanism part of the force-controlled pushing device 51, the position and/or orientation of the robot 50, the direction or magnitude of the force acting between the tool 52 and the workpiece 53, the position and/or orientation of the robot 50, the force-controlled pushing device 51, and the first object, etc. As seen above, adjusting the robot movement command depending on the status of the robot system 11, so as to change, adjust, or correct the movement/motion of the robot 50, enables the operator 56 to more easily bring the first object into appropriate contact with the second object and to move them relative to each other in the movement/operation of the robot 50.

The force-controlled pushing device's pushing direction setting part 33 sets a pushing direction, i.e., a direction that the force-controlled pushing device 51 moves the movement mechanism part, so as to push the first object held by the force-controlled pushing device 51 against the second object. The force-controlled pushing device's pushing direction setting part 33 sets, as a pushing direction, a direction making a predetermined angle with the moving direction of the first object, a direction associated with the moving direction of the first object, a direction associated with the position and/or orientation of the first object, a direction making a predetermined angle with the direction of movement/operation of the robot 50, a direction associated with the direction of movement/operation of the robot 50, a direction associated with the position and/or orientation of the robot 50, a direction making a predetermined angle with the moving direction of the first object with respect to the second object, a direction associated with the moving direction of the first object with respect to the second object, a direction associated with the position and/or orientation of the first object with respect to the second object, etc. Further, the force-controlled pushing device's pushing direction setting part 33 sets, as a pushing direction, a predetermined direction, such as a direction associated with the position and/or orientation of the movement mechanism part of the force-controlled pushing device 51 in the system reference coordinate system, a direction making a predetermined angle with the moving direction of the movement mechanism part of the force-controlled pushing device 51 based on the position and/or orientation of the movement mechanism part of the force-controlled pushing device 51 in the system reference coordinate system, a direction associated with the moving direction of the movement mechanism part of the force-controlled pushing device 51 in the system reference coordinate system, etc. Alternatively, the force-controlled pushing device's pushing direction setting part 33 may be set so that, when the position and/or orientation in the operable range of the movement mechanism part, which moves the force-controlled pushing device 51, comes into a predetermined position and/or orientation, the pushing direction is changed to a predetermined direction. Alternatively, the force-controlled pushing device's pushing direction setting part 33 may set, as a pushing direction, a predetermined direction, such as the aforementioned direction associated with the movement command or a direction given in a predetermined relationship with the moving direction on the basis of the movement command, based on not only the actual position and/or orientation of the first object, the force-controlled pushing device 51, or the robot 50 but also the movement command for the force-controlled pushing device 51, the robot 50, or the first object.

In addition to the aforementioned setting methods, the force-controlled pushing device's pushing direction setting part 33 obtains a predetermined direction or a direction that satisfies a predetermined relationship, which depends on the state of the position and/or orientation of the first object held by the force-controlled pushing device 51, the status of the movement, position and/or orientation of the first object in a predetermined period of time, the moving direction of the first object, the status of the movement command for the force-controlled pushing device 51, the speed of the first object relative to the second object, the position and/or orientation of the first object with respect to the second object, the position and/or orientation of the movement mechanism part of the force-controlled pushing device 51, the position of each axis of the robot 50, the position and/or orientation of the tip end of the robot 50, the robot movement command for moving the robot 50, the moving direction of the robot 50, the force acting on the first object held by the force-controlled pushing device 51, the force acting on the robot 50, the input signal from the outside, the input given by the operator 56, etc., and sets the obtained direction as a pushing direction. Thus, the pushing direction of the force-controlled pushing device 51 can be changed to a direction depending on the status of the robot system 11 or a direction that satisfies a predetermined relationship, or can be switched to a direction previously prepared depending on the status of the robot system 11.

The force-controlled pushing device's target pushing force setting part 34 sets a target pushing force, i.e., a target force necessary when the first object held by the force-controlled pushing device 51 is pushed against the second object. In this respect, the force-controlled pushing device's target pushing force setting part 34 sets a target pushing force of the force-controlled pushing device 51 based on at least one of a predetermined value, the position, orientation, or position and orientation of the first object, the force-controlled pushing device movement command, the position, orientation, or position and orientation of the movement mechanism part of the force-controlled pushing device 51, the position, orientation, or position and orientation of the robot 50, or the robot movement command for moving the robot 50.

The force-controlled pushing device's target pushing force setting part 34 sets a predetermined value as a target pushing force. Specifically, the force-controlled pushing device's target pushing force setting part 34 sets, as a target pushing force, a predetermined value determined by obtaining a value depending on the status, by obtaining a value that satisfies a predetermined relationship depending on the status, or by switching between values prepared depending on the status. This setting depends on the speed of the first object held by the force-controlled pushing device 51 relative to the second object, the position and/or orientation of the first object with respect to the second object, the state of the position and/or orientation of the first object held by the force-controlled pushing device 51, the status of the movement, position and/or orientation of the first object in a predetermined period of time, the status of the movement command for the force-controlled pushing device 51, the position and/or orientation of the movement mechanism part of the force-controlled pushing device 51, the position of each axis of the robot 50, the position and/or orientation of the tip end of the robot 50, the robot movement command for moving the robot 50, the force acting on the first object held by the force-controlled pushing device 51, the force acting on the robot 50, the input signal from the outside, the input given by the operator 56, etc. For example, the target pushing force may be increased at angles or corners of the workpiece 53 or portions estimated as such portions, or the target pushing force may be decreased at linear portions of the workpiece 53 or portions estimated as such portions. Alternatively, the target pushing force may be set at a predetermined value at portions which are determined as having a predetermined shape. Alternatively, when the force acting between the first object and the second object is smaller than the target pushing force, or such a state continues, the target pushing force may be set at a large value during a predetermined period of time or until the pushing force is stabilized at a predetermined value.

The force-controlled pushing device's force measuring part 35 measures a force acting on the force-controlled pushing device 51, or a force acting between the first object held by the force-controlled pushing device 51 and the second object which is not held by the force-controlled pushing device 51. If a sensor is used when the force-controlled pushing device's force measuring part 35 measures a force, examples of the sensor include any sensors, which can measure a force, such as a distortion gauge-type sensor, a capacitance sensor, a piezoelectric sensor, a sensor using a piezoelectric effect of a crystal, an optical sensor, a magnetic sensor, etc. Further, the sensor used for measuring a force may be provided at a given place, such as a portion between the force-controlled pushing device 51 and the first object held by the force-controlled pushing device 51, the contact portion of the first object, which contacts the second object, or the mechanism part which is a component of the force-controlled pushing device 51. Alternatively, a sensor for measuring a force may be provided at the robot 50 or the working table 57, i.e., a portion other than an object attached to the robot 50, or the second object which is not held by the robot 50, so as to measure the force acting between the first object and the second object.

Alternatively, when an actuator for driving the force-controlled pushing device 51 is, for example, an electric motor driven by electric current, a force may be estimated and measured from the value of the current. Alternatively, when an actuator for driving the force-controlled pushing device 51 is driven by the pressure of fluid including air or oil, the force may be estimated and measured from a difference between the movement command for the force-controlled pushing device 51 and the actual position.

It is preferable that, when the force-controlled pushing device's force measuring part 35 measures a force applied by, for example, the gravitational force or inertia force of another object, other than the net force acting between the first object and the second object, the force other than the net force is compensated when needed.

The force-controlled pushing device's force measuring part 35 is only required to be capable of measuring, in the force acting between the first object and the second object, a force in relation to the pushing direction, but is preferably capable of measuring the force acting between the first object and the second object in relation to a direction other than the pushing direction. Being capable of measuring the force acting between the first object and the second object in a direction other than the pushing direction enables a status, such as an overload or contact in the direction other than the pushing direction, to be detected and treated, enables the mass or the center of gravity of the first object to be calculated, enables a coordinate system to be set based on the force acting on the first object, enables the first object and the second object to be brought into contact with each other at predetermined surfaces thereof, or enables the object held by the force-controlled pushing device 51 to be engaged with another object. Further, during the automatic operation of the robot 50, a plurality of functions can be realized based on the force in the moving direction of the first object or the robot 50. For example, when burring, polishing, grinding, etc. are performed, the amount of machining, such as the amount of grinding can be estimated and calculated, and an appropriate measure is performed based on the calculated result.

The force-controlled pushing device movement command calculating part 36 calculates a force-controlled pushing device movement command, i.e., a movement command for the movement mechanism part of the force-controlled pushing device 51, based on the pushing direction set by the force-controlled pushing device's pushing direction setting part 33, the target pushing force set by the force-controlled pushing device's target pushing force setting part 34, and the force measured by the force-controlled pushing device's force measuring part 35. The force-controlled pushing device movement command calculating part 36 calculates a force-controlled pushing device movement command depending on the force measured by the force-controlled pushing device's force measuring part 35 by performing a predetermined arithmetic processing for the pushing direction set by the force-controlled pushing device's pushing direction setting part 33, e.g., multiplying the value of the difference between the target pushing force set by the force-controlled pushing device's target pushing force setting part 34 and the force measured by the force-controlled pushing device's force measuring part 35 by a predetermined factor; obtaining an output by assigning the obtained value to a predetermined relational expression; saturating the pushing direction by another given value; or smoothing the pushing direction to smooth the value. The predetermined factor or predetermined relational expression, the value to be saturated, etc. may be changed depending on the situation. Further, regarding the force-controlled pushing device movement command calculated at this time, it is preferable that the magnitude of a force is adjusted, the pushing device is stopped, or the command is adjusted so as to move the pushing device in an escaping direction when, for example, a collision is detected, depending on the status of, for example, the position and/or orientation of the robot 50, the force-controlled pushing device 51, and the first object. Examples of this status include the moving speed of the robot 50, the moving direction of the robot 50, whether the robot 50 moves or stops, the input signal from the outside, the input given by the operator 56, the occurrence of problems such as troubles in the force-controlled pushing device 51 and the robot 50, the moving direction of the force-controlled pushing device 51 in the system reference coordinate system, the moving direction in the movement mechanism part of the force-controlled pushing device 51, the force measured by the force-controlled pushing device's force measuring part 35, the position and/or orientation of the movement mechanism part of the force-controlled pushing device 51 in the system reference coordinate system, the position and/or orientation in the operable range of the movement mechanism part of the force-controlled pushing device 51, the position and/or orientation of the robot 50, the direction or magnitude of the force acting between the tool 52 and the workpiece 53, whether the robot 50 moves or stops, etc.

The robot moving direction suitability determination part 37 determines the suitability (appropriate or inappropriate) of the moving direction of the robot 50 based on the position and/or orientation in the operable range of the movement mechanism part of the force-controlled pushing device 51. Further, the robot moving direction suitability determination part 37 determines the suitability of the moving direction of the robot 50 based on the position and/or orientation in the operable range of the movement mechanism part of the force-controlled pushing device 51 and the pushing direction of the force-controlled pushing device 51. Note that the moving direction of the robot 50 means a moving direction involving the robot 50 in relation to the relative moving direction between the tool 52 and the workpiece 53, e.g., the moving direction of, for example, the tip end of the robot 50, the force-controlled pushing device 51 attached to the robot 50, or the first object attached to or held by the robot 50.

The robot moving direction suitability determination part 37 determines that the suitability of the moving direction of the robot 50 is improved as the position and/or orientation in the operable range of the movement mechanism part of the force-controlled pushing device 51 are closer to the center of the operable range of the movement mechanism part of the force-controlled pushing device 51, and determines that the suitability is deteriorated as the position and/or orientation are further away from the center. Alternatively, the robot moving direction suitability determination part 37 may calculate a score for suitability determination so that the score can be improved as the position and/or orientation in the operable range of the movement mechanism part of the force-controlled pushing device 51 are closer to the center of the operable range of the movement mechanism part of the force-controlled pushing device 51, and may calculate a score for suitability determination so that the score can be reduced as the position and/or orientation are further away from the center.

Alternatively, the robot moving direction suitability determination part 37 may take the position and/or orientation in the operable range of the movement mechanism part of the force-controlled pushing device 51 and the pushing direction of the force-controlled pushing device 51 into consideration, so as to calculate a score so that the score is reduced as the distance from the center of the operable range of the movement mechanism part of the force-controlled pushing device 51 in a direction opposite to the pushing direction is increased, and accordingly, the movable distance in the direction opposite to the pushing direction is reduced. At the same time, the part 37 may determine that the suitability is bad. When the distance from the center of the operable range of the movement mechanism part of the force-controlled pushing device 51 in the pushing direction is increased, the movable distance in the direction opposite to the pushing direction is increased, and accordingly, the part 37 may calculate a score so that the score is improved, and may determine that the suitability is good.

Alternatively, the robot moving direction suitability determination part 37 may determine, when the robot 50 moves in the moving/operating direction of the robot 50 based on the robot operation input given by the operator 56, that the moving direction of the robot 50 is inappropriate and is not good, in the case where the fact that the position and/or orientation in the operable range of the movement mechanism part of the force-controlled pushing device 51 approaches or reaches a predetermined range from the boundary of the operable range, causes an overload to tend to be applied to the force-controlled pushing device 51, to be applied to the robot 50, or to be applied between the first object and the second object, is determined from the position and/or orientation in the operable range of the movement mechanism part of the force-controlled pushing device 51, the moving direction of the robot 50, and the pushing direction of the force-controlled pushing device 51. Further, the part 37 may determine that the moving direction of the robot 50 is good in the case other the aforementioned case, or may calculate a score depending on the degree of adequacy of the good state.

Figure 7:
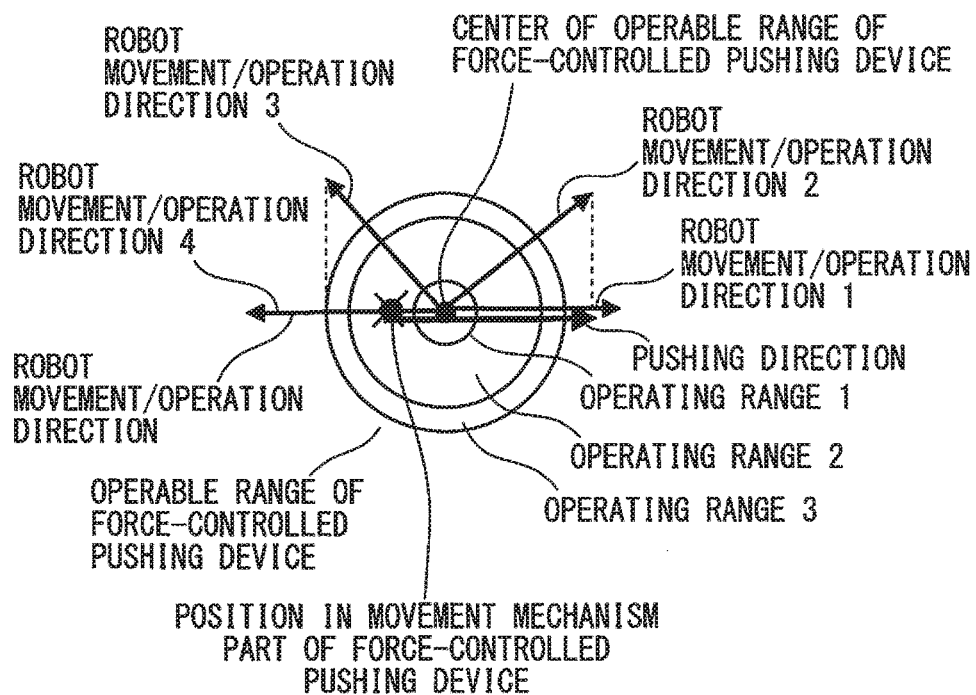
FIG. 7 is a view of a movement state of a force-controlled pushing device according to an embodiment of this disclosure.

Alternatively, the robot moving direction suitability determination part 37 may determine the suitability and may calculate a score for the suitability as follows. Here, suppose that: the movement mechanism part of the force-controlled pushing device 51 is comprised of two perpendicular axes, and has two degrees of freedom; the ranges of motion of the movement mechanism part in the axial directions have the same length; and the operable range of the movement mechanism part is a circle. FIG. 7 is a top view of a plane including an operable range of the force-controlled pushing device 51 and the center of the operable range when the drive axes of the force-controlled pushing device 51 are two perpendicular axes, and the operable range is a circle. Note that, here, moving the robot 50 in the moving/operating direction of the robot 50, when the force-controlled pushing device 51 is attached to the tip end of the robot 50, causes the force-controlled pushing device 51 to move in the moving/operating direction of the robot 50. In this respect, as shown in FIG. 7, in the operable range of the force-controlled pushing device 51, a predetermined range from the center of the operable range of the force-controlled pushing device 51 is an operating range 1; a predetermined range from the center of the operable range, which is larger than the operating range 1 and which excludes the operating range 1, is an operating range 2; and a predetermined range from the center of the operable range, which is larger than the operating range 2 and which exclude the operating range 1 and the operating range 2, is an operating range 3.

Figure 8:
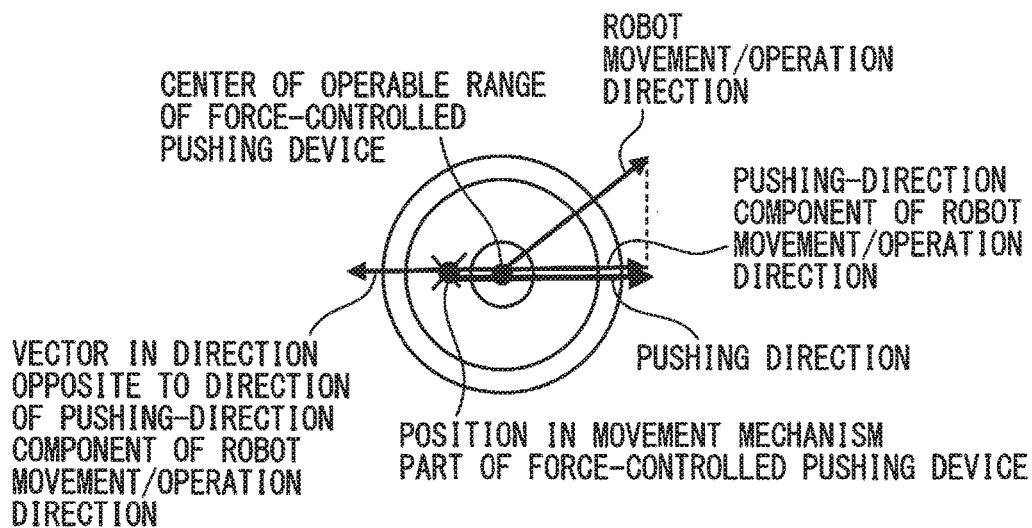
FIG. 8 is a view of a movement state of a force-controlled pushing device according to an embodiment of this disclosure.

FIG. 8 is a top view of a plane including an operable range of the force-controlled pushing device 51 and the center of the operable range when the drive axes of the force-controlled pushing device 51 are two perpendicular axes, and the operable range is a circle. Note that, here, moving the robot 50 in the moving/operating direction of the robot 50, when the force-controlled pushing device 51 is attached to the tip end of the robot 50, causes the force-controlled pushing device 51 to move in the moving/operating direction of the robot 50. When the first object held by the force-controlled pushing device 51 contacts another object, such as the second object, as shown in FIG. 8, the movement/operation of the robot 50 and the movement of the movement mechanism part of the force-controlled pushing device 51 in the pushing direction cause, in a straight line, in which the center of the operable range of the force-controlled pushing device 51 and a vector in the pushing direction are present, the position in the movement mechanism part of the force-controlled pushing device 51 to move in the direction of a vector opposite to the vector of a pushing-direction component of the vector in the moving/operating direction of the robot 50 (a projective component in the pushing direction of the vector in the moving/operating direction of the robot 50), with respect to the center of the operable range of the force-controlled pushing device 51. In this respect, in the straight line, in which the center of the operable range of the force-controlled pushing device 51 and the vector in the pushing direction are present, based on the amount of movement caused by the movement/operation of the robot 50, and the amount of movement in the pushing direction of the force-controlled pushing device 51, a moving direction may be selected and the amount of movement in the selected moving direction may be calculated, and thereafter, the suitability of the moving direction of the robot 50 may be determined from the selected moving direction and moving amount, and the position in the movement mechanism part of the force-controlled pushing device 51, or the degree of the suitability of the moving direction of the robot 50 may be calculated as a score.

Alternatively, the robot moving direction suitability determination part 37 may determine the suitability and may calculate a score for the suitability as follows. In the following description, suppose that the position in the movement mechanism part of the force-controlled pushing device 51 is provided at any of the operating range 1, the operating range 2, and the operating range 3, which are shown in FIG. 7. Further, suppose that the first object held by the force-controlled pushing device 51 contacts another object, e.g., the second object. Note that the pushing direction is provided in a straight line connecting the center of the operable range of the force-controlled pushing device 51 to the position in the movement mechanism part of the force-controlled pushing device 51.

As shown in FIG. 7, when the position in the movement mechanism part of the force-controlled pushing device 51 is present in the operating range 1, the determination in which the suitability is good, or a good score is obtained regardless of the moving direction of the robot 50 or the amount of movement. Alternatively, as shown in FIG. 7, when the position in the movement mechanism part of the force-controlled pushing device 51 is present in the operating range 2, and the direction of a pushing-direction component vector of the vector in the moving/operating direction of the robot 50 corresponds to the direction in which the center of the operable range of the force-controlled pushing device 51 is present, pushing the first object against the second object causes the position in the movement mechanism part of the force-controlled pushing device 51 to move in a direction opposite to the pushing direction, and to move away from the center of the operable range, and accordingly, the fact that the suitability is not good may be determined, and the score may be reduced depending on the magnitude of a pushing direction component of the vector in the moving/operating direction of the robot 50. In contrast, when the position in the movement mechanism part of the force-controlled pushing device 51 is present in the operating range 2, and the direction of a pushing direction component vector of the vector in the moving/operating direction of the robot 50 corresponds to the direction opposite to the direction in which the center of the operable range of the force-controlled pushing device 51 is present, pushing the first object against the second object causes the position in the movement mechanism part of the force-controlled pushing device 51 to move in a direction opposite to the pushing direction, and to move closer to the center of the operable range, and accordingly, the fact that the suitability is good may be determined, and the score may be improved depending on the magnitude of the vector in the moving/operating direction of the robot 50.

Alternatively, as shown in FIG. 7, when the position in the movement mechanism part of the force-controlled pushing device 51 is present in the operating range 3, and the direction of a pushing direction component vector of the vector in the moving/operating direction of the robot 50 corresponds to the direction in which the center of the operable range of the force-controlled pushing device 51 is present, pushing the first object against the second object causes the position in the movement mechanism part of the force-controlled pushing device 51 to move in a direction opposite to the pushing direction, and to move away from the center of the operable range, and accordingly, the fact that the suitability is not good may be determined, and the worst score may be obtained. In contrast, when the position in the movement mechanism part of the force-controlled pushing device 51 is present in the operating range 3, and the direction of a pushing direction component vector of the vector in the moving/operating direction of the robot 50 corresponds to the direction opposite to the direction in which the center of the operable range of the force-controlled pushing device 51 is present, pushing the first object against the second object causes the position in the movement mechanism part of the force-controlled pushing device 51 to move in a direction opposite to the pushing direction, and to move closer to the center of the operable range, and accordingly, the fact that the suitability is good may be determined, and the score may be improved depending on the magnitude of the vector in the moving/operating direction of the robot 50.

Another example of the determination of the suitability of the robot moving direction suitability determination part 37 and the calculation of a score will be described below. Here, the position in the movement mechanism part of the force-controlled pushing device 51 corresponds to the illustrated position in the operating range 2 as shown in FIG. 7, and the direction from the position in the movement mechanism part of the force-controlled pushing device 51 toward the center of the operable range of the force-controlled pushing device 51 corresponds to the pushing direction. Further, suppose that the first object held by the force-controlled pushing device 51 contacts another object, e.g., the second object.

When the position in the movement mechanism part of the force-controlled pushing device 51 corresponds to the position in the operating range 2, which is shown in FIG. 7, in relation to a moving/operating direction 1 of the robot 50, moving the first object in that direction, so as to push the first object against the second object, causes the position in the movement mechanism part of the force-controlled pushing device 51 to move away from the center of the operable range of the force-controlled pushing device 51, and accordingly, the fact that the suitability of the moving direction of the robot 50 is not good is determined, and the score is reduced. Alternatively, when the position in the movement mechanism part of the force-controlled pushing device 51 corresponds to the position in the operating range 2, which is shown in FIG. 7, in relation to the moving/operating direction 2 of the robot 50, moving the first object in that direction, so as to push the first object against the second object, causes the position in the movement mechanism part of the force-controlled pushing device 51 to move away from the center of the operable range of the force-controlled pushing device 51, and accordingly, the fact that the suitability of the moving direction of the robot 50 is not good may be determined. Further, the amount of movement of the position in the movement mechanism part of the force-controlled pushing device 51 away from the center of the operable range of the force-controlled pushing device 51 is smaller than the amount of movement in the case where the robot 50 moves in the moving/operating direction 1, and accordingly, the score may be more improved than the score in the case of the moving/operating direction 1.

When the position in the movement mechanism part of the force-controlled pushing device 51 corresponds to the position in the operating range 2, which is shown in FIG. 7, in relation to the moving/operating direction 3 of the robot 50, moving the first object in that direction, so as to push the first object against the second object, causes the position in the movement mechanism part of the force-controlled pushing device 51 to move closer to the center of the operable range of the force-controlled pushing device 51, and accordingly, the fact that the suitability of the moving direction of the robot 50 is good is determined, and the score is more improved than in the moving/operating direction 2 of the robot 50. Further, when the position in the movement mechanism part of the force-controlled pushing device 51 corresponds to the position in the operating range 2, which is shown in FIG. 7, in relation to the moving/operating direction 4 of the robot 50, moving the first object in that direction, so as to push the first object against the second object, causes the position in the movement mechanism part of the force-controlled pushing device 51 to move closer to the center of the operable range of the force-controlled pushing device 51, and accordingly, the fact that the suitability of the moving direction of the robot 50 is good is determined, and the score is more improved than in the moving/operating direction 3 of the robot 50 because the amount of movement of the position in the movement mechanism part of the force-controlled pushing device 51 closer to the center of the operable range of the force-controlled pushing device 51 is larger than that in the moving/operating direction 1 of the robot 50. Note that, even when the position in the movement mechanism part of the force-controlled pushing device 51 moves closer to the center of the operable range of the force-controlled pushing device 51, if the amount of movement is large, the fact that the suitability is not good may be determined, or the score may be reduced, depending on the amount.

Alternatively, the robot moving direction suitability determination part 37 may calculate a score so that the score is improved as the shortest distance from the position in the movement mechanism part of the force-controlled pushing device 51 to the boundary of the operable range of the force-controlled pushing device 51 increases, and may determine that the suitability of the current moving direction of the robot 50 is good as the score is large.

As described above, the robot moving direction suitability determination part 37 determines the suitability of the direction of movement/operation of the robot 50, calculates a score for the suitability so as to obtain a determination result for the suitability of the moving direction of the robot 50, and, based on the obtained information, adjusts the movement command for the robot 50, stops the robot 50, or gives the information to the operator. Thus, the first object and the second object can more reliably and easily be in appropriate contact with each other, and can be moved relative to each other.

The robot moving direction suitability determination result output command part 38 outputs a command for displaying/outputting characters, numerical values, colors, pictures, codes, graphics, or patterns depending on the determination result of the robot moving direction suitability determination part 37, a command for displaying/outputting the characters, numerical values, colors, pictures, codes, graphics, or patterns after changing the display cycle thereof, a command for outputting sounds, or a command for providing/outputting vibrations, or outputs a command for adjusting the movement command for the robot 50 to the robot movement command calculating part 32 so that the robot movement command calculating part 32 outputs the determination result of the robot moving direction suitability determination part 37 by reducing the magnitude of the movement command for the robot 50 or reducing the same to zero.

Embodiments of the robot moving direction suitability determination result output command part 38 will be described in detail below. The robot moving direction suitability determination result output command part 38 outputs, depending on the determination result of the robot moving direction suitability determination part 37, a command for displaying/outputting the suitability of the direction of movement/operation of the robot 50, or a numerical value depending on the score for the suitability. Alternatively, the robot moving direction suitability determination result output command part 38 outputs, depending on the determination result of the robot moving direction suitability determination part 37, a command for displaying colors, or displaying colors after changing the colors of the displayed characters or numerical values, pictures, codes, graphics, patterns, etc., based on the suitability of the direction of movement/operation of the robot 50 or the score for the suitability. Alternatively, the robot moving direction suitability determination result output command part 38 outputs, depending on the determination result of the robot moving direction suitability determination part 37, a command for displaying characters or pictures, codes, graphics, and patterns, or changing the display based on the suitability of the direction of movement/operation of the robot 50, or the score for the suitability. For example, the display of an icon displayed at a part of the screen may be changed.

Alternatively, the robot moving direction suitability determination result output command part 38 outputs, depending on the determination result of the robot moving direction suitability determination part 37, a command for displaying/outputting characters, numerical values, colors, pictures, codes, graphics, or patterns based on the suitability of the direction of movement/operation of the robot 50 or the score for the suitability. Alternatively, the robot moving direction suitability determination result output command part 38 outputs, depending on the determination result of the robot moving direction suitability determination part 37, a command for outputting sounds based on the suitability of the direction of movement/operation of the robot 50 or the score for the suitability. The sounds may include a sound which can be changed in its pitch, length, or loudness, a sound obtained by changing a voice such as a message or word, a buzzer sound, a sound effect, a melody, and any sounds, in which the difference therebetween can be recognized by the operator 56.

Alternatively, the robot moving direction suitability determination result output command part 38 outputs, depending on the determination result of the robot moving direction suitability determination part 37, a command for presenting/outputting vibration based on the suitability of the direction of movement/operation of the robot 50 or the score for the suitability. For example, the robot moving direction suitability determination result output command part 38 outputs a presenting/outputting command, so that large vibrations or short-period vibrations, etc. are presented to the operator 56 if the direction of movement/operation of the robot 50 is inappropriate.

Alternatively, the robot moving direction suitability determination result output command part 38 outputs, depending on the determination result of the robot moving direction suitability determination part 37, a command for performing, based on the suitability of the direction of movement/operation of the robot 50 or the score for the suitability, an adjustment in which, if the direction of movement/operation of the robot 50 is inappropriate, the robot movement command calculating part 32 stops the movement/operation of the robot 50, or reduces the moving speed. For example, as described above with reference to FIG. 7, when the score for the suitability of the direction of movement/operation of the robot 50 is calculated so that the score in the moving/operating direction 1 is better than in the moving/operating direction 2, the score in the moving/operating direction 2 is better than in the moving/operating direction 3, and the score in the moving/operating direction 3 is better than in the moving/operating direction 4, in order to determine the suitability of the direction of movement/operation of the robot 50, the moving speed of the movement/operation of the robot 50 is increased as the score is improved, based on the score for the suitability of the direction of movement/operation of the robot 50, so that, in the same movement/operation, the amount of the movement/operation of the robot 50 in the moving/operating direction 2 is larger than in the moving/operating direction 1, the amount in the moving/operating direction 3 is larger than in the moving/operating direction 2, and the amount in the moving/operating direction 4 is larger than in the moving/operating direction 3. Further, when, for example, the movement/operation of the robot 50 is performed by the direct teach, and the robot operation input measuring part 31 measures the robot operation input for the movement/operation by the direct teach, the flexibility of the direct teach is changed depending on the result of the determination of the suitability of the direction of movement/operation of the robot 50. In other words, the suitability of the direction of movement/operation of the robot 50 is bad, and the score for the suitability of the moving/operating direction of the robot 50 is bad because the movement/operation of the robot 50 causes the movement mechanism part of the force-controlled pushing device 51 to move closer to the boundary of the operable range of the force-controlled pushing device 51, or move away from the center of the movement mechanism part of the force-controlled pushing device 51, an operational feeling set by the direct teach in the movement/operation is stiffened, or the movement is prohibited.

The robot system 11 may include, for example, an image output device or indication light device for displaying images, such as characters, numerical values, colors, pictures, codes, graphics, patterns, etc., a sound output device for outputting sounds, a vibration output device for presenting/outputting vibrations, or a sense presenting device for presenting tactile sense, smell, or wind to the operator 56. Regarding these devices, i.e., the image output device, the indication light device, the sound output device, the vibration output device, and the sense presenting device, if a teaching device for setting, operating, and teaching the robot 50, and a teaching device for setting or operating the force-controlled pushing device 51 are provided, these devices may be incorporated in or attached to such teaching devices. Alternatively, when the robot guidance device 55 shown in FIGS. 1, 3, and 4 or the robot guidance device 55*a* shown in FIG. 5 is used for giving a robot operation input for moving/operating the robot 50, and measuring the robot operation input by the robot operation input measuring part 31, the sense presenting device etc. may be provided in the robot guidance device 55 or the robot guidance device 55*a*.

In order to cause the operator 56 to recognize whether the moving direction of the robot 50 is appropriate or not, and the degree of its adequacy, the robot moving direction suitability determination result output command part 38 changes, depending on the determination result of the robot moving direction suitability determination part 37, an output command for an image output device or indication light device for displaying images, such as characters, numerical values, colors, pictures, codes, graphics, patterns, etc., a sound output device for outputting sounds, a vibration output device for presenting/outputting vibrations, or a sense presenting device for presenting tactile sense, smell, or wind to the operator 56, or the presentation cycle of these outputs, or the part 38 changes, when a teaching device for setting or operating the robot 50 or the force-controlled pushing device 51 is provided, the presentation cycle of the output.

The robot movement allowing direction setting part 39 sets a robot movement allowing direction, i.e., a direction for allowing the movement of the robot 50 in the movement/operation of the robot 50. When the robot movement allowing direction setting part 39 sets the robot movement allowing direction, the robot movement command calculating part 32 calculates a robot movement command based on the robot operation input measured by the robot operation input measuring part 31 and the robot movement allowing direction.

In the setting of the robot movement allowing direction by the robot movement allowing direction setting part 39, it is preferable that the robot movement allowing direction can be set or switched by a teaching device or input device, e.g., a teaching device for the robot 50, a teaching device for setting or operating the force-controlled pushing device 51, an input device attached to a device for moving/operating the robot 50, an input device attached to the robot guidance device 55 or the robot guidance device 55*a*, an input device for inputting an external signal, etc.

The directions that allow the movement of the robot 50 are designated as, for example, directions of one or a plurality of given axes in the coordinate system, in which the robot 50 moves/operates, and around the given axes. The coordinate system, in which the robot 50 moves/operates, is set as a system reference coordinate system, a coordinate system which is fixed in space, a tool coordinate system, i.e., a coordinate system set for an object attached to the tip end of the robot 50 or the tip end of the robot 50, or a coordinate system set in the surrounding portion away from the robot 50, e.g., the workpiece 53 or the working table 57.

When the operator 56 moves/operates the robot 50, and the robot operation input measuring part 31 measures a robot operation input regarding directions other than the robot movement allowing directions set by the robot movement allowing direction setting part 39, the magnitude, sign, direction, etc. of the robot operation input for directions other than the robot movement allowing directions may be set as inputs for the other functions provided in the robot 50. For example, based on the magnitude, sign, direction, etc. of the robot operation input for directions other than the robot movement allowing directions, in the robot movement command calculating part 32, the amount of movement of the robot 50 is adjusted, the acceleration and deceleration of the robot 50 is adjusted, and the moving motion is stopped. Further, based on the magnitude, sign, direction, etc. of the robot operation input for directions other than the robot movement allowing directions, in the force-controlled pushing device's pushing direction setting part 33, the pushing direction of the force-controlled pushing device 51 is changed or switched. Further, based on the magnitude, sign, direction, etc. of the robot operation input for directions other than the robot movement allowing directions, in the force-controlled pushing device's target pushing force setting part 34, the magnitude of the target pushing force of the force-controlled pushing device 51 is changed. Further, based on the magnitude, sign, direction, etc. of the robot operation input for directions other than the robot movement allowing directions, in the force-controlled pushing device movement command calculating part 36, the movement command for the mechanism part of the force-controlled pushing device 51 is adjusted, and the magnitude of acceleration and deceleration of the movement mechanism part of the force-controlled pushing device 51 is adjusted. Further, based on the magnitude, sign, direction, etc. of the robot operation input for directions other than the robot movement allowing directions, in the force-controlled pushing device movement command calculating part 36, the position control mode and the force control mode are switched. Further, based on the magnitude, sign, direction, etc. of the robot operation input for directions other than the robot movement allowing directions, in the robot moving direction suitability determination result output command part 38, the settings of a command to be output depending on the determination result of the robot moving direction suitability determination part 37 are changed, and the kind of the command to be output or the output destination of the command is switched.

Further, in the robot motion program generating part 40 that will be described later, based on the magnitude, sign, direction, etc. of the robot operation input for directions other than the robot movement allowing directions, the position and/or orientation of the first object, which are used when a motion program for the robot 50 is generated, are obtained, the position and/or orientation of the robot 50, which are used when a motion program for the robot 50 is generated, are obtained, or various settings necessary when a motion program for the robot 50 is generated are changed. Further, in the pushing state suitability determination part 41 that will be described later, based on the magnitude, sign, direction, etc. of the robot operation input for directions other than the robot movement allowing directions, a determination method for determining the suitability of the contact state between the first object and the second object, or settings, such as threshold values to be used in the determination are changed. Further, in the pushing state suitability determination result output command part 42 that will be described later, the setting of a command to be output depending on the determination result of the pushing state suitability determination part 41 is changed, the kind of the command to be output or the output destination of the command is switched.

The robot motion program generating part 40 generates a motion program for the robot 50. In this respect, it is preferable that the robot motion program generating part 40 obtains the position and/or orientation of the first object, the position and/or orientation of the tip end of the robot 50, or the position and/or orientation of the force-controlled pushing device 51 on the system reference coordinate system, the coordinate system set in the robot 50, or the coordinate system which can represent the position and/or orientation of the robot 50, when a predetermined control cycle or a predetermined condition is satisfied, and generates a motion program for moving the robot 50 based on the obtained position and/or orientation.

The predetermined condition described above means a condition in which the movement mechanism part of the force-controlled pushing device 51, the first object, or the robot 50 is in a predetermined state. Examples of the predetermined state includes a state in which the force acting between the first object and the second object is not less than a predetermined value or within a predetermined range, and the first object and the second object are in appropriate contact with each other, a state in which the force acting on the force-controlled pushing device 51 or the first object is not less than a predetermined value or within a predetermined range, and accordingly, is appropriate, a state in which the position and/or orientation in the operable range of the movement mechanism part of the force-controlled pushing device 51 are within a predetermined range, and accordingly, are appropriate, a state in which the position and/or orientation of the robot 50 moved/operated by the operator 56 are within a predetermined range, and accordingly, are appropriate, a state in which the robot operation input is appropriate, a state in which the moving direction of the robot 50 is appropriate, etc.

Alternatively, examples of the case where the predetermined condition is satisfied may include the case where the operator 56 inputs the robot operation input, or the case where the operator 56 performs an input operation by, for example, the input device.

As seen above, in the robot system 11, the robot motion program generating part 40 generates a motion program for the robot 50 based on the position and/or orientation of the tip end of the robot 50, the position and/or orientation of the first object, or the position and/or orientation of the force-controlled pushing device 51 when the tool 52 and the workpiece 53 are in a predetermined state.

It is preferable that the robot motion program generating part 40 causes, based on the position and/or orientation of the first object on the system reference coordinate system in which the tool 52 and the workpiece 53 are in contact with each other, a motion program for the robot 50 so that the position and/or orientation of the first object is located at the center of the operable range of the movement mechanism part of the force-controlled pushing device 51. This enables, when the robot 50 moves, the tool 52 and the workpiece 53 to move relative to each other while the tool 52 and the workpiece 53 are in contact with or are almost in contact with each other. Further, when the robot 50 be moved, and the force-controlled pushing device 51 moves the first object so that an appropriate force acts between the first object and the second object, during the automatic operation of the robot 50 which is not moved/operated by the operator 56, moving the robot 50 using the generated motion program for the robot 50 enables the amount of movement of the movement mechanism part of the force-controlled pushing device 51 to be reduced, and the tool 52 and the workpiece 53 to be in appropriate contact with each other.

Alternatively, when the occurrence tendency of deviation in the relative position and/or orientation between the first object and the second object is already known, the robot motion program generating part 40 may generate a motion program for the robot 50 so that the position and/or orientation of the first object correspond to the reference position and/or orientation in the operable range of the force-controlled pushing device 51, which are deviated by a predetermined amount from the center of the operable range of the movement mechanism part of the force-controlled pushing device 51, in a predetermined direction, and a wide range, which extends from the reference position and/or orientation of the force-controlled pushing device 51 to the first object and the second object which are in contact with each other, is provided. This enables the manageable deviation in the operable range of the force-controlled pushing device 51, i.e., the manageable range between the reference position and/or orientation in the operable range of the force-controlled pushing device 51 and the position and/or orientation until the first object and the second object come into contact with each other can be set to be as large as possible, and accordingly, enables the tool 52 and the workpiece 53 to be in more appropriate contact with each other even when the second object moves largely away from the reference position and/or orientation in the operable range of the force-controlled pushing device 51 during the moving motion of the robot 50.

The generated motion program for the robot 50 is contained in a storage part provided in, for example, a controller for controlling the robot 50, or an external storage device. Alternatively, the generated motion program may be transferred, via a network, to and contained in an external controller or an external storage device, to which the controller 54 for the robot and the force-controlled pushing device is connected.

The pushing state suitability determination part 41 determines the suitability of a pushing state in which the first object held by the force-controlled pushing device 51 is pushed against the second object, i.e., a contact state between the first object and the second object when the first object be moved toward the second object in the pushing direction. The pushing state suitability determination part 41 may determine, regarding the force acting between the first object and the second object in the pushing direction, whether the force acting between the first object and the second object is within a predetermined range from a predetermined target pushing force, whether the ratio of the force acting between the first object and the second object to a predetermined target pushing force is within a predetermined range, whether the force acting between the first object and the second object is larger than the predetermined target pushing force, whether the force acting between the first object and the second object is larger than a predetermined threshold value, whether the force acting between the first object and the second object is smaller than a predetermined threshold value in a predetermined period of time, whether a change in the force acting between the first object and the second object is within a predetermined range, etc., so as to determine, based on the force acting between the first object and the second object, the suitability of the pushing state between the first object and the second object, i.e., whether the pushing state is appropriate, and calculate, as a score, the degree of the suitability.

Alternatively, the pushing state suitability determination part 41 may determine, regarding the force acting between the first object and the second object in the pushing direction or other directions, whether the force acting between the first object and the second object is within a predetermined range from a predetermined target pushing force, whether the ratio of the force acting between the first object and the second object to a predetermined target pushing force is within a predetermined range, whether the force acting between the first object and the second object is larger than a predetermined target pushing force, whether the force acting between the first object and the second object is larger than a predetermined threshold value, whether the force acting between the first object and the second object is smaller than a predetermined threshold value in a predetermined period of time, whether a change in the force acting between the first object and the second object is within a predetermined range, etc., so as to determine, based on the force acting between the first object and the second object, the suitability of the pushing state, i.e., whether the pushing state, i.e., the contact state when the first object is pushed against the second object by the robot 50 and the force-controlled pushing device 51 is appropriate, and calculate, as a score, the degree of the suitability.

The pushing state suitability determination result output command part 42 outputs, depending on the determination result of the pushing state suitability determination part 41, a command for displaying/outputting characters, numerical values, colors, pictures, codes, graphics, or patterns, a command for displaying/outputting the characters, numerical values, colors, pictures, codes, graphics, or patterns after changing the display cycle thereof, a command for outputting sounds, or a command for presenting/outputting vibrations, or outputs a command for adjusting the movement command for the robot 50 to the robot movement command calculating part 32, so that the robot movement command calculating part 32 outputs the determination result of the pushing state suitability determination part 41 by reducing the magnitude of the movement command for the robot 50 or reducing the same to zero.

The pushing state suitability determination result output command part 42 outputs, depending on the determination result of the pushing state suitability determination part 41 regarding the pushing state including the contact state between the first object and the second object in the pushing direction, or the pushing state including the contact state between the first object and the second object in the pushing direction or other directions, a command for displaying/outputting a numerical value depending on the suitability of the pushing state between the first object and the second object, or the score for the suitability. Alternatively, the pushing state suitability determination result output command part 42 outputs, depending on the determination result of the pushing state suitability determination part 41, an output displaying command for displaying colors, or displaying characters or numerical values, pictures, codes, graphics, patterns, etc. after changing the color thereof, based on the suitability of the pushing state between the first object and the second object and the score for the suitability.

Alternatively, the pushing state suitability determination result output command part 42 outputs, depending on the determination result of the pushing state suitability determination part 41, a display outputting command for displaying characters or pictures, codes, graphics, or patterns, or changing the display, based on the suitability of the pushing state between the first object and the second object or the score for the suitability. For example, the display of an icon displayed at a part of the screen may be changed. Alternatively, the pushing state suitability determination result output command part 42 changes, depending on the determination result of the pushing state suitability determination part 41, the display cycle of characters, numerical values, colors, pictures, codes, graphics, or patterns based on the suitability of the pushing state between the first object and the second object or the score for the suitability, and outputs a display outputting command. Alternatively, the pushing state suitability determination result output command part 42 outputs, depending on the determination result of the pushing state suitability determination part 41, a command for outputting sounds based on the suitability of the pushing state between the first object and the second object or the score for the suitability. The sounds may include a sound which can be changed in its pitch, length, or loudness, a sound obtained by changing a voice such as a message or word, a buzzer sound, a sound effect, a melody, and any sounds, in which the difference therebetween can be recognized by the operator 56. Alternatively, the pushing state suitability determination result output command part 42 outputs, depending on the determination result of the pushing state suitability determination part 41, a command for presenting/displaying vibrations, based on the suitability of the pushing state between the first object and the second object or the score for the suitability. For example, a presenting/outputting command is output, so that large vibrations or short-period vibrations, etc. are presented to the operator 56 if the pushing state between the first object and the second object is inappropriate. Alternatively, the pushing state suitability determination result output command part 42 outputs, depending on the determination result of the pushing state suitability determination part 41, a command for performing, when the pushing state between the first object and the second object is inappropriate, i.e., the objects are away from each other, or an overload is applied to the objects, an adjustment, in which the robot movement command calculating part 32 stops or decelerates the movement/operation of the robot 50, based on the suitability of the pushing state between the first object and the second object or the score for the suitability.

As described above, the robot system 11 may include, for example, an image output device or indication light device for displaying images, such as characters, numerical values, colors, pictures, codes, graphics, patterns, etc., a sound output device for outputting sounds, a vibration output device for presenting/outputting vibrations, or a sense presenting device for presenting tactile sense, smell, or wind to the operator 56.

The pushing state suitability determination result output command part 42 changes, depending on the determination result of the pushing state suitability determination part 41, an output command for an image output device or indication light device for displaying images, such as characters, numerical values, colors, pictures, codes, graphics, patterns, etc., a sound output device for outputting sounds, a vibration output device for presenting/outputting vibrations, or a sense presenting device for presenting tactile sense, smell, or wind to the operator 56, or the presentation cycle of these outputs, or the part 42 changes, when a teaching device for setting or operating the robot 50 or the force-controlled pushing device 51 is provided, the presentation cycle of the output.

The force-controlled pushing device's pushing direction setting part 33 according to the first embodiment of this disclosure sets, assuming that, in the robot system 11, one of the tool 52 and the workpiece 53 held by the force-controlled pushing device 51 is a first object, the pushing direction of the force-controlled pushing device 51, based on at least one of the position, orientation, or position and orientation of the first object, a force-controlled pushing device movement command for moving the first object, the position, orientation, or position and orientation of the movement mechanism part of the force-controlled pushing device 51, the position, orientation, or position and orientation of the robot 50, or a robot movement command for moving the robot 50.

As seen above, setting the pushing direction of the force-controlled pushing device 51, taking the position and/or orientation of the first object, the position and/or orientation of the force-controlled pushing device 51, the position and/or orientation of the robot 50, the movement command for the force-controlled pushing device 51 for moving the first object, and the movement command for the robot 50 into consideration, enables, during the movement/operation of the robot 50, the pushing direction of the force-controlled pushing device 51 to be set in an appropriate direction depending on the status of the robot system 11, and accordingly, the operator 56 can move the first object and the second object relative to each other while they are in appropriate contact with without being away from each other.

Figure 9:
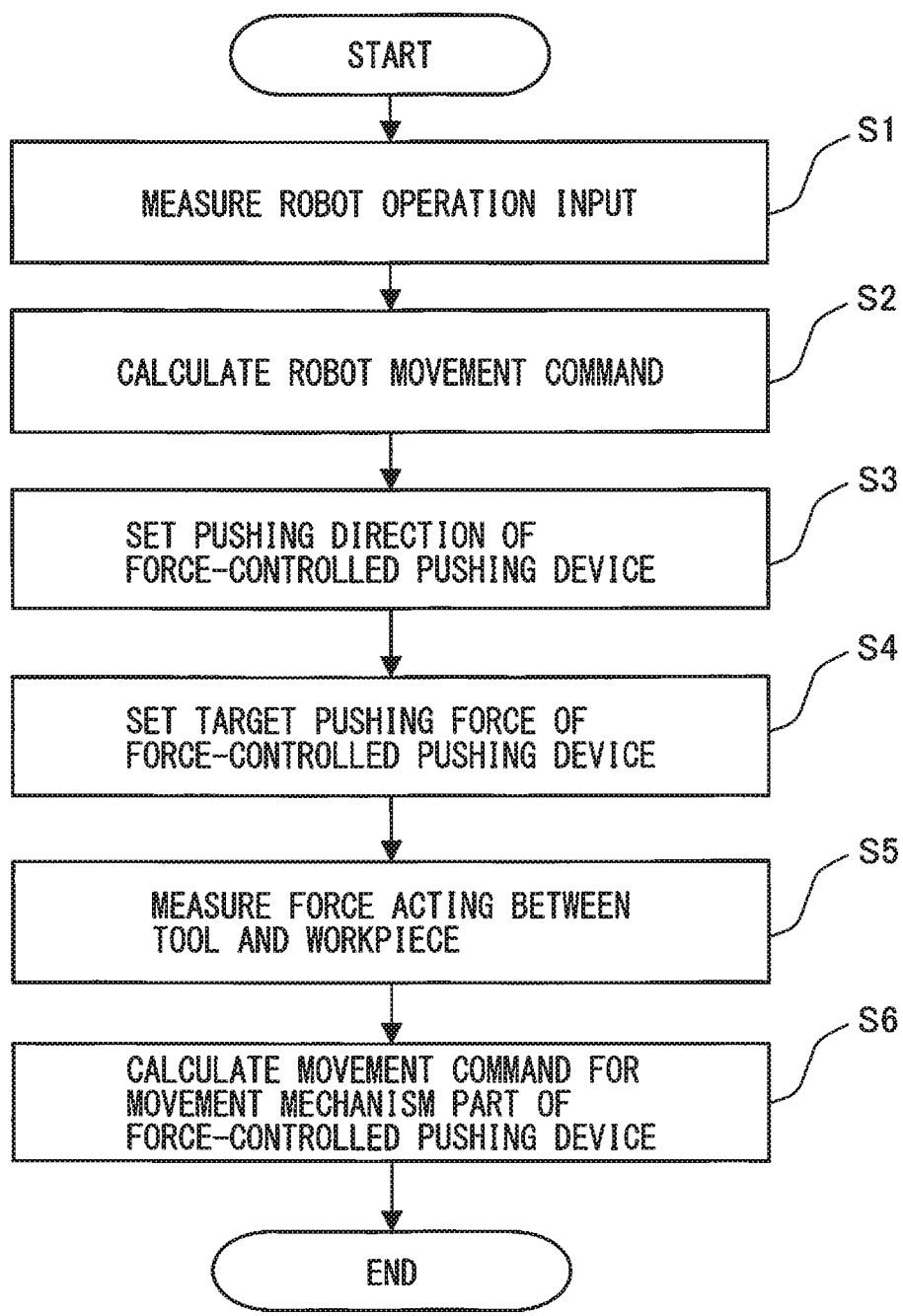
FIG. 9 is a flowchart of a processing process performed by the robot system according to an embodiment of this disclosure.

Subsequently, an example of the process of treatment performed by the robot system 11 according to an embodiment of this disclosure when the force-controlled pushing device 51 provided at the tip end of the robot 50 controls the force acting between the tool 52 and the workpiece 53, so as to move the tool 52 and the workpiece 53 relative to each other when the operator 56 moves/operates the robot 50, will be described with reference to the flowchart shown in FIG. 9. Note that the treatment does not have to be performed in the sequence of the flowchart shown in FIG. 9, and a series of treatments described here is an example, and accordingly, the present invention is not limited to this specific example.

First, the operator 56 gives a robot operation input for moving/operating the robot 50, so as to move/operate the robot 50. The robot operation input measuring part 31 measures a robot operation input for moving/operating the robot 50 given by the operator 56 (step S1). Subsequently, the robot movement command calculating part 32 calculates, based on the robot operation input measured by the robot operation input measuring part 31, a robot movement command, i.e., a movement command for the robot 50 (step S2). Subsequently, the force-controlled pushing device's pushing direction setting part 33 sets a pushing direction of the force-controlled pushing device 51 (step S3). Subsequently, the force-controlled pushing device's target pushing force setting part 34 sets a target pushing force of the force-controlled pushing device 51 (step S4). Subsequently, the force-controlled pushing device's force measuring part 35 measures a force acting between the first object held by the force-controlled pushing device 51 and the second object (between the tool and the workpiece) (step S5). Subsequently, the force-controlled pushing device movement command calculating part 36 calculates, based on the pushing direction set by the force-controlled pushing device's pushing direction setting part 33, the target pushing force set by the force-controlled pushing device's target pushing force setting part 34, and the force measured by the force-controlled pushing device's force measuring part 35, a force-controlled pushing device movement command, i.e., a movement command for the movement mechanism part of the force-controlled pushing device 51 (step S6). The robot 50 of the robot system 11 moves in accordance with the calculated robot movement command, and the force-controlled pushing device 51 moves in accordance with the calculated force-controlled pushing device movement command.

For example, when the movement/operation of the robot 50 is performed by the direct teach, and the robot operation input measuring part 31 measures a robot operation input for movement/operation performed by the direct teach, the pushing direction of the force-controlled pushing device 51 can be set depending on the movement status of, for example, the first object, the force-controlled pushing device 51, and the robot 50, which are depending on the movement/operation of the robot 50 performed by the direct teach.

As seen above, in the robot system 11 according to the first embodiment of this disclosure, the pushing direction of the force-controlled pushing device 51 is set depending on the status of the robot system 11, e.g., the first object, the force-controlled pushing device 51, or the robot 50, and accordingly, the tool 52 and the workpiece 53 can more reliably and appropriately come into contact with each other. Further, the operator 56 may roughly move/operate the robot 50 regardless of the abilities for the movement/operation of the robot 50, and the tool 52 and the workpiece 53 can be in appropriate contact with each other by an easier movement/operation of the robot 50.

In a second embodiment of this disclosure, a description of a part of the configuration and function of the robot system 11, which overlaps with that of the robot system 11 according to the first embodiment, is omitted. Further, a description of the configuration and function similar to those described in the other embodiment is omitted.

According to the robot system 11 in the second embodiment of this disclosure, in the first robot system 11, the robot movement command calculating part 32 adjusts the amount of movement in the robot movement command, or prevents the robot 50 from moving, based on at least one of the position, orientation, or position and orientation in the operable range of the movement mechanism part of the force-controlled pushing device 51, the pushing direction set by the force-controlled pushing device's pushing direction setting part 33, or the force measured by the force-controlled pushing device's force measuring part 35.

The robot movement command calculating part 32 reduces, based on the position and/or orientation in the operable range of the movement mechanism part of the force-controlled pushing device 51, i.e., the position and/or orientation of a first object holding portion of the movement mechanism part of the force-controlled pushing device 51 with respect to the force-controlled pushing device 51, the amount of movement in the robot movement command as the position and/or orientation are closer to the boundary of the operable range of the movement mechanism part of the force-controlled pushing device 51, or prevents the robot 50 from moving when the position and/or orientation remain within a predetermined threshold value of the boundary of the operable range of the movement mechanism part of the force-controlled pushing device 51.

Taking the pushing direction of the force-controlled pushing device 51 into consideration, when the position and/or orientation in the operable range of the movement mechanism part of the force-controlled pushing device 51 are located closer to the boundary of the operable range of the force-controlled pushing device 51 in the pushing direction, the amount of movement in the robot movement command is reduced, the robot 50 is prevented from moving, or the moving direction of the robot 50 is corrected so that a pushing direction component is added thereto. Alternatively, when the position and/or orientation in the operable range of the movement mechanism part of the force-controlled pushing device 51 is located closer to the boundary of the operable range of the force-controlled pushing device 51 in the pushing direction, the amount of movement in the robot movement command may be reduced, or the robot 50 may be prevented from moving, in relation to a direction including a component in a direction opposite to the pushing direction of the force-controlled pushing device 51.

Taking the pushing direction of the force-controlled pushing device 51 into consideration, when the position and/or orientation in the operable range of the movement mechanism part of the force-controlled pushing device 51 are located closer to the boundary of the operable range in a direction opposite to the pushing direction of the force-controlled pushing device 51, the amount of movement in the robot movement command may be reduced, the robot 50 may be prevented from moving, or the moving direction of the robot 50 may be corrected so that a component in a direction opposite to the pushing direction is added thereto. Alternatively, the position and/or orientation in the operable range of the movement mechanism part of the force-controlled pushing device 51 are located closer to the boundary of the operable range in a direction opposite to the pushing direction of the force-controlled pushing device 51, the amount of movement in the robot movement command may be reduced, or the robot 50 may be prevented from moving, in relation to a direction including a component in the pushing direction of the force-controlled pushing device 51.

When, based on the force measured by the force-controlled pushing device's force measuring part 35, the force acting between the first object and the second object is less than a predetermined threshold value, or the force acting between the first object and the second object in the pushing direction is less than a predetermined threshold value, the amount of movement in the robot movement command may be reduced, the robot 50 may be prevented from moving, or the moving direction of the robot 50 may be corrected so that a pushing-direction component is added thereto. Alternatively, when, based on the force measured by the force-controlled pushing device's force measuring part 35, the force acting between the first object and the second object is less than a predetermined threshold value, or the force acting between the first object and the second object in the pushing direction is less than a predetermined threshold value, the amount of movement in the robot movement command may be reduced, or the robot 50 may be prevented from moving, in relation to a direction including a component in a direction opposite to the pushing direction of the force-controlled pushing device 51. This enables the tool 52 and the workpiece 53 to be more reliably in contact with each other.

When, based on the force measured by the force-controlled pushing device's force measuring part 35, the force acting between the first object and the second object is greater than a predetermined threshold value, the force acting between the first object and the second object in the pushing direction is greater than a predetermined threshold value, or the force acting between the first object and the second object in a direction perpendicular to the pushing direction or a direction other than the pushing direction is greater than a predetermined threshold value, the amount of movement in the robot movement command may be reduced, the robot 50 may be prevented from moving, or the moving direction of the robot 50 may be corrected so that a component in a direction opposite to the pushing direction is added thereto. Alternatively, when, based on the force measured by the force-controlled pushing device's force measuring part 35, the force acting between the first object and the second object is greater than a predetermined threshold value, the force acting between the first object and the second object in the pushing direction is greater than a predetermined threshold value, or the force acting between the first object and the second object in a direction perpendicular to the pushing direction or a direction other than the pushing direction is greater than a predetermined threshold value, the amount of movement in the robot movement command may be reduced, or the robot 50 may be prevented from moving, in relation to a direction including a component in the pushing direction of the force-controlled pushing device 51. This enables a force exceeding a predetermined threshold value to be prevented from being applied between the tool 52 and the workpiece 53.

When an overload is applied to the force-controlled pushing device 51; the force acting between the first object and the second object is greater than a predetermined threshold value; the force acting between the first object and the second object in the pushing direction is greater than a predetermined threshold value; or the force acting between the first object and the second object in a direction perpendicular to the pushing direction or a direction other than the pushing direction is greater than a predetermined threshold value, the movement/operation of the robot 50 may be stopped after the robot 50 is moved in a direction including a component in a direction opposite to the pushing direction.

As seen above, it is preferable that the robot movement command calculating part 32 detects, based on at least one of the position and/or orientation in the operable range of the movement mechanism part of the force-controlled pushing device 51, the pushing direction set by the force-controlled pushing device's pushing direction setting part 33, or the force measured by the force-controlled pushing device's force measuring part 35, an inappropriate state of the robot 50, the force acting between the first object and the second object, or the force-controlled pushing device 51, so as to adjust the amount of movement in the robot movement command, or prevent the robot 50 from moving. Examples of the inappropriate state include a state in which the movement/operation of the robot 50 is inappropriate, a state in which the force control is not appropriately performed by the force-controlled pushing device 51, and the first object and the second object are not in appropriate contact with each other, a state in which an appropriate force is not applied between the first object and the second object, a state in which the force applied to the force-controlled pushing device 51 or the position and/or orientation of the movement mechanism part of the force-controlled pushing device 51 is not appropriate, and a state in which the pushing direction of the force-controlled pushing device 51 is inappropriate.

Depending on the position and/or orientation of the movement mechanism part in the operable range of the movement mechanism part of the force-controlled pushing device 51, the pushing direction of the force-controlled pushing device 51, or the force measured by the force-controlled pushing device's force measuring part 35, or taking these conditions into consideration, an inappropriate status, e.g., a status in which the movement mechanism part is located closer to the boundary of the operable range of the force-controlled pushing device 51, a status in which an overload is applied to the force-controlled pushing device 51 or the object held by the force-controlled pushing device 51, or a status in which the object held by the force-controlled pushing device 51 does not contact another object, or an inappropriate status of the contact state between the tool 52 and the workpiece 53 can be detected. Further, depending on such conditions of the force-controlled pushing device 51, the amount of movement in the robot movement command can be adjusted, or the aforementioned inappropriate conditions can be prevented from further worsening, or can be avoided or improved by stopping the moving motion of the robot 50.

When the movement/operation of the robot 50 is performed by the direct teach, it is preferable, as described above, that, depending on the state of the force-controlled pushing device 51, the flexibility of the movement/operational feeling by the direct teach of the robot 50 is changed, or the robot 50 is stopped.

As seen above, the movement/operation of the robot 50 is adjusted depending on the status of the force-controlled pushing device 51, and accordingly, the tool 52 and the workpiece 53 can more safely, reliably, and appropriately be brought into contact with each other. Further, the operator 56 may roughly move/operate the robot 50 regardless of the abilities for the movement/operation of the robot 50, and the tool 52 and the workpiece 53 can be in appropriate contact with each other by simpler movement/operation of the robot 50.

In a third embodiment of this disclosure, a description of a part of the configuration and function of the robot system 11, which overlaps with that of the robot systems 11 according to the first and second embodiments, is omitted. Further, a description of the configuration and function, which are similar to those described in the other embodiments, is omitted.

According to the robot system 11 according to the third embodiment of this disclosure, in the first or second robot system 11, the force-controlled pushing device 51 includes a movement mechanism part, which controls a force acting between a first object, i.e., one of the tool 52 held by the force-controlled pushing device 51 and the workpiece 53 and a second object, i.e., the other of the tool 52 and the workpiece 53, so as to move the first object, so that the first object is pushed, in a predetermined pushing direction set by the force-controlled pushing device's pushing direction setting part 33, by a predetermined target pushing force, and, regarding one direction perpendicular to the predetermined pushing direction or two directions which are perpendicular to the predetermined pushing direction and are perpendicular to each other, the first object is pushed by an around-axis target pushing force, i.e., a predetermined force around the axis in the one direction or each of the two directions. The force-controlled pushing device's target pushing force setting part 34 sets a target pushing force and an around-axis target pushing force. The force-controlled pushing device movement command calculating part 36 calculates, based on the pushing direction set by the force-controlled pushing device's pushing direction setting part 33, the target pushing force and the around-axis target pushing force, which are set by the force-controlled pushing device's target pushing force setting part 34, and the force measured by the force-controlled pushing device's force measuring part 35, a force-controlled pushing device movement command, i.e., a movement command for the movement mechanism part of the force-controlled pushing device 51.

Thus, the force-controlled pushing device 51 holds the first object, and moves the first object while controlling the force acting between the first object and the second object, so as to push the first object against the second object in a predetermined pushing direction set by the force-controlled pushing device's pushing direction setting part 33, by a predetermined target pushing force, and so as to push, regarding one direction perpendicular to the predetermined pushing direction or two directions which are perpendicular to the predetermined pushing direction and are perpendicular to each other, the first object around the axis in the one direction or each of the two directions, by a predetermined around-axis target pushing force, and thus, the first object is pushed against the second object so that predetermined surfaces thereof contact with each other, and the first object and the second object can be moved relative to each other. Thus, for example, a predetermined surface of the tool 52 for polishing, grinding, or burring held by the force-controlled pushing device 51 provided at the tip end of the robot 50 can be brought into contact with a predetermined surface of the workpiece 53, or a predetermined surface of the workpiece 53 held by the force-controlled pushing device 51 provided at the tip end of the robot 50 can be brought into contact with a predetermined surface of the tool 5 for polishing, grinding, or burring. Further, after the predetermined surface of the first object is brought into contact with the predetermined surface of the second object, the position and/or orientation of the first object can be moved relative to the second object.

The predetermined surface of the first object is brought into contact with the predetermined surface of the second object by the force-controlled pushing device 51 independent from the movement mechanism part of the robot 50, and accordingly, even when the responsiveness or operation performance of the force control or position control for the robot 50 is bad, the use of the force-controlled pushing device 51 having good responsiveness or operation performance in the force control or position control enables the predetermined surface of the first object and the predetermined surface of the second object to rapidly and stably come into contact with each other. When the force-controlled pushing device 51 can easily be attached to/detached from the robot 50, the force-controlled pushing device 51 is used if it is needed for the robot 50, and is used for another robot if it is not needed for the robot 50, and thus, the cost of the robot system 11 can be reduced. When, in general, a machine or device having a movement mechanism part is rapidly moved, the time interval of maintenance is reduced. However, if the operation performance of the force-controlled pushing device 51 which can be attached to/detached from the robot 50 is improved, the maintenance can be performed by periodically removing only the force-controlled pushing device 51. When the robot 50 controls the force acting between the first object and the second object, it is necessary to move the entirety of the robot 50. However, when the force-controlled pushing device 51 is used, it is only required to move a minimum part, i.e., a mechanism part, and accordingly, the movement thereof is more rapid than the movement of the entirety of the robot 50, and the load applied to the movement mechanism part of the robot 50 can be reduced. Thus, the time interval of maintenance of the robot 50 can be increased. When a predetermined surface of the first object and a predetermined surface of the second object come into contact with each other, if this contact is achieved by the robot 50, it is necessary to move a plurality of axes. Thus, the use of the force-controlled pushing device 51 makes the aforementioned effects remarkable.

As seen above, according to the third embodiment, during the movement/operation of the robot, a simple movement/operation, e.g., a rough movement of the robot enables the tool and the workpiece to be moved relative to each other while the surfaces of the contact portions thereof are in contact with each other. During the movement/operation of the robot, even when the relative speed between the tool and the workpiece is increased, the surfaces of the contact portions of the tool and the workpiece can be brought into contact with each other while the tool and the workpiece are pushed by a predetermined force. Even in the case where vibrations occur in the motion of the robot during the movement thereof, the case where the control state of the robot is unstable, the case where the orbit is corrected so as to avoid the vicinity of a singular posture, the case where the moving motion of the robot is deviated from the taught orbit due to, for example, the avoidance of collision or interference with a surrounding stuff or person, or the case where the moving motion of the robot caused by the operator is not very appropriate, the force acting between the tool and the workpiece can be appropriately controlled, and the surfaces of the contact portions of the tool and the workpiece can be brought into contact with each other.

In a fourth embodiment of this disclosure, a description of a part of the configuration and function of the robot system 11, which overlaps with that of the robot systems 11 according to the first to third embodiments, is omitted. Further, a description of the configuration and function, which are similar to those described in the other embodiments, is omitted.

According to the robot system 11 in the fourth embodiment of this disclosure, in any one of the first to third robot systems 11, the force-controlled pushing device's pushing direction setting part 33 sets, as a pushing direction of the force-controlled pushing device 51, a predetermined direction, which depends on at least one of the position, orientation, or position and orientation of the first object, a force-controlled pushing device movement command for moving the first object, the position, orientation, or position and orientation of the movement mechanism part of the force-controlled pushing device 51, the moving direction of the first object, the position, orientation, or position and orientation of the robot 50, the robot movement command for moving the robot 50, or the moving direction of the robot 50.

The force-controlled pushing device's pushing direction setting part 33 sets, as a pushing direction of the force-controlled pushing device 51, a predetermined direction which is associated with the position and/or orientation of the first object or which is associated with a range (which means, hereinafter, a range in straight line, a range in plane, or a range in space) including the position and/or orientation of the first object. Alternatively, the force-controlled pushing device's pushing direction setting part 33 sets, as a pushing direction of the force-controlled pushing device 51, a predetermined direction which is associated with a force-controlled pushing device movement command for moving the first object or which is associated with a range including a force-controlled pushing device movement command for moving the first object. Alternatively, the force-controlled pushing device's pushing direction setting part 33 sets, as a pushing direction of the force-controlled pushing device 51, a predetermined direction which is associated with the position and/or orientation of the movement mechanism part of the force-controlled pushing device 51 in the system reference coordinate system or the position and/or orientation in the operable range of the movement mechanism part of the force-controlled pushing device 51 or which is associated with the range including the position and/or orientation of the movement mechanism part of the force-controlled pushing device 51. Alternatively, the force-controlled pushing device's pushing direction setting part 33 sets, as a pushing direction of the force-controlled pushing device 51, a predetermined direction which is associated with the moving direction of the first object or which is associated with the range including the moving direction of the first object. Alternatively, the force-controlled pushing device's pushing direction setting part 33 sets, as a pushing direction of the force-controlled pushing device 51, a predetermined direction which is associated with the position and/or orientation of the robot 50 or which is associated with the range including the position and/or orientation of the robot 50. Alternatively, the force-controlled pushing device's pushing direction setting part 33 sets, as a pushing direction of the force-controlled pushing device 51, a predetermined direction which is associated with the robot movement command for moving the robot 50 or which is associated with the range including the position and/or orientation of the robot movement command for moving the robot 50. Alternatively, the force-controlled pushing device's pushing direction setting part 33 sets, as a pushing direction of the force-controlled pushing device 51, a predetermined direction which is associated with the moving direction of the robot 50 or which is associated with the range including the moving direction of the robot 50. Alternatively, the force-controlled pushing device's pushing direction setting part 33 sets, as a pushing direction of the force-controlled pushing device 51, a predetermined direction which is associated, as in the above cases, taking a plurality of conditions, i.e., the position and/or orientation, movement command, moving direction, etc. of the first object, the force-controlled pushing device 51, and the robot 50 into consideration.

The force-controlled pushing device's pushing direction setting part 33 can set a pushing direction depending on the status of the robot system 11, or can set a pushing direction after changing the same, by setting, as a pushing direction of the force-controlled pushing device 51, a predetermined direction depending on the position and/or orientation, movement command, and moving direction of the first object, the force-controlled pushing device 51, and the robot 50. Thus, the operator 56 can more easily prevent the first object and the second object from being away from each other, or can cause them to be brought into contact with each other by an appropriate force, in the movement/operation of the robot 50.

As seen above, according to the fourth embodiment, based on the position, orientation, or position and orientation of the first object moved by the force-controlled pushing device, a predetermined direction is set as a pushing direction of the force-controlled pushing device, and accordingly, a desired direction can be adopted as the pushing direction, depending on the status of the position and/or orientation of the first object. Further, based on the position, orientation, or position and orientation of the first object, the moving direction of the first object can be found, and a desired direction can be adopted as the pushing direction, depending on the moving direction of the first object, and the status of the movement of the first object. A predetermined direction is set as the pushing direction of force-controlled pushing device based on the force-controlled pushing device movement command, and accordingly, a desired direction can be adopted as the pushing direction. A predetermined direction is set as the pushing direction of the force-controlled pushing device based on the position and/or orientation of the movement mechanism part of the force-controlled pushing device, and accordingly, a desired direction can be adopted as the pushing direction, depending on the status of the position and/or orientation of the movement mechanism part of the force-controlled pushing device in the reference coordinate system set with respect to the robot. When the position and/or orientation of the movement mechanism part of the force-controlled pushing device, which is moving, in the operable range is tuned into a predetermined status, changing the pushing direction enables the pushing direction to be turned into a desired direction. A predetermined direction is set as the pushing direction of the force-controlled pushing device based on the moving direction of the first object, and accordingly, a desired direction can be adopted as the pushing direction, depending on the moving direction of the first object. A predetermined direction is set as the pushing direction of the force-controlled pushing device based on the position, orientation, or position and orientation of the robot, and accordingly, a desired direction can be adopted as the pushing direction, depending on the position and/or orientation of the robot. Further, based on the position, orientation, or position and orientation of the robot, the moving direction of the robot can be found, a desired direction can be adopted as the pushing direction, depending on the moving direction of the robot, and the movement of the robot. A predetermined direction is set as the pushing direction of the force-controlled pushing device based on the robot movement command for moving the robot, and accordingly, a desired direction can be adopted as the pushing direction, depending on the status of the movement command for the robot. A predetermined direction is set as the pushing direction of the force-controlled pushing device based on the moving direction of the robot, and accordingly, a desired direction can be adopted as the pushing direction, depending on the moving direction of the robot. When, for example, the fact that the target portion is a corner portion is determined based on the position and/or orientation of the first object, the moving direction of the first object, and the force measured by the force-controlled pushing device's force measuring part, and the pushing direction, which is appropriate to cause the tool and the workpiece to be in appropriate contact with each other, is not found from, for example, the position and/or orientation of the first object, the position and/or orientation of the force-controlled pushing device, etc., moving the first object based on the moving direction of the robot enables the tool and the workpiece to be appropriately moved relative to each other. As seen above, the pushing direction of the force-controlled pushing device can be set depending on the status of the robot system, and accordingly, the tool and the workpiece can easily be brought into appropriate contact with each other during the movement/operation of the robot.

In a fifth embodiment of this disclosure, a description of a part of the configuration and function of the robot system 11, which overlaps with that of the robot systems 11 according to the first to third embodiments, is omitted. Further, a description of the configuration and function, which are similar to those described in the other embodiments, is omitted.

According to the robot system 11 in the fifth embodiment of this disclosure, in any one of the first to third robot systems 11, the force-controlled pushing device's pushing direction setting part 33 estimates, based on a plurality of positions of the first object, e.g., the position of the first object at a predetermined time, or the position of the first object that has been moved by only a predetermined distance, the shape of the portion of the workpiece 53, with which the tool 52 is brought into contact, and sets, as a pushing direction of the force-controlled pushing device 51, a direction making a predetermined angle with the shape of the workpiece 53.

Figure 10:
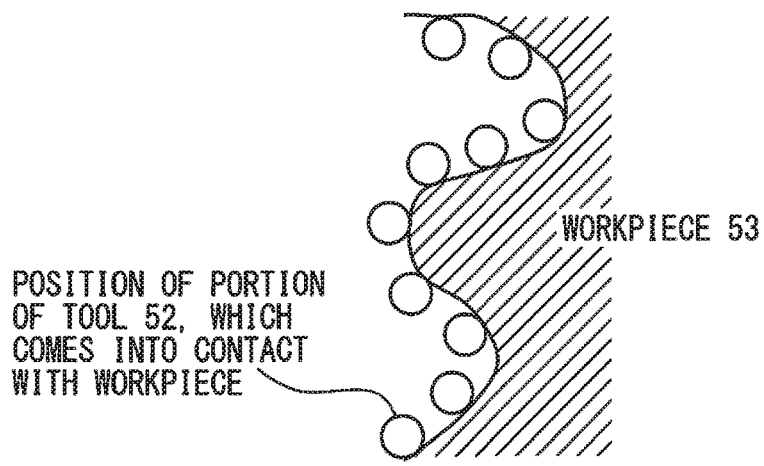
FIG. 10 is a view of a change in the position of a portion of a tool being in contact with a workpiece.

Suppose that, in the case where the operator 56 moves/operates the robot 50, when the robot 50 and the force-controlled pushing device 51 control the force acting between the first object, i.e., the tool 52 and the second object, i.e., the workpiece 53, the portion of the tool 52, which is brought into contact with the workpiece 53, moves with respect to the workpiece 53, as shown in FIG. 10.

The force-controlled pushing device's pushing direction setting part 33 estimates, based on a plurality of positions of the first object, e.g., the position of the first object at a predetermined time or the position of the first object that has been moved by only a predetermined distance, the shape of the portion of the workpiece 53, with which the tool 52 is brought into contact. In this respect, the shape of the portion of the workpiece 53, with which the tool 52 is in contact, may be the entire shape of the portion of the workpiece 53, in which the tool 52 moves relative to the workpiece 53 while being in contact with, i.e., a rough shape but not a detailed shape. Alternatively, based on the position of the first object, which is calculated based on the movement command for the robot 50 and the movement command for the force-controlled pushing device 51, the shape of the workpiece 53, relative to which the tool 52 being in contact with the workpiece 53 is moved, may be estimated.

Alternatively, the force-controlled pushing device's pushing direction setting part 33 finds, based on a plurality of positions of the first object, e.g., the position of the first object at a predetermined time or the position of the first object that has been moved by only a predetermined distance, a direction in which the first object moves, and finds the direction of the tangent to the shape of the portion of the workpiece 53, with which the tool 52 comes into contact.

Figure 11:
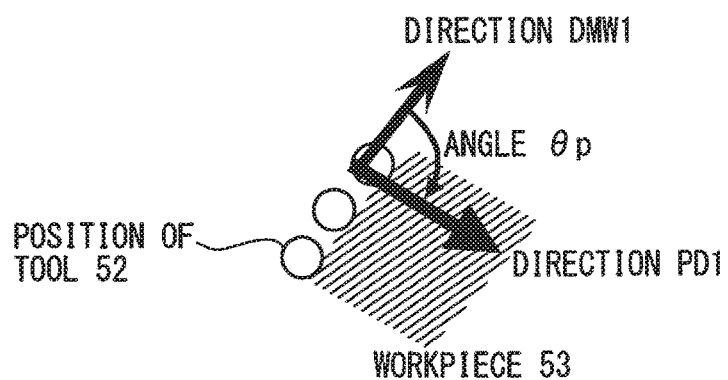
FIG. 11 is a view of a method for setting pushing directions.

Subsequently, as shown in FIG. 11, the force-controlled pushing device's pushing direction setting part 33 sets, as pushing directions of the force-controlled pushing device 51, the shape of the workpiece 53, a direction DMW1, i.e., the direction of the tangent to the outline of the shape of the workpiece 53, a rough workpiece shape, or the workpiece 53, and a direction PD1, i.e., a direction making a predetermined angle θp with the shape of the workpiece 53, which is found based on, for example, the moving direction of the tool 52, or the moving direction of the tool 52. The predetermined angle θp means an angle between the direction of the tangent to a shape similar to the actual workpiece shape, a rough workpiece shape, or a workpiece shape, and a direction perpendicular to the moving direction of the tool 52 and toward the workpiece 53. Alternatively, the predetermined angle θp may be set, based on the direction of rotation if the tool 52 is a rotary tool, the relative moving direction between the tool 52 and the workpiece 53, the force acting between the first object and the second object, and the direction of the force acting on the force-controlled pushing device 51 or the first object, so that the absolute value of the angle θp is less than 90 degrees, or greater than 90 degrees.

As seen above, the force-controlled pushing device's pushing direction setting part 33 estimates, based on the position of the first object at a predetermined time, the shape of the workpiece 53 with which the tool 52 comes into contact, and sets, as a pushing direction of the force-controlled pushing device 51, a direction making a predetermined angle with the shape of the portion of the workpiece 53, with which the tool 52 comes into contact. Thus, the operator 56 can more easily prevent the first object and the second object from being away from each other, or can cause them to be brought into contact with each other by an appropriate force, in the movement/operation of the robot 50.

As seen above, according to the fifth embodiment, the shape of the workpiece, with which the tool comes into contact, is estimated based on a plurality of positions of the first object, and then, setting, as a pushing direction, a predetermined direction along the shape of the workpiece enables the operator to easily bring, during the movement/operation of the robot, the tool and the workpiece into appropriate contact with each other, so as to move the tool and the workpiece relative to each other.

In a sixth embodiment of this disclosure, a description of a part of the configuration and function of the robot system 11, which overlaps with that of the robot systems 11 according to the first to third embodiments, is omitted. Further, a description of the configuration and function, which are similar to those described in the other embodiments, is omitted.

According to the robot system 11 in the sixth embodiment of this disclosure, in any one of the first to third robot systems 11, the force-controlled pushing device's pushing direction setting part 33 switches, based on the force, which acts between the first object and the second object, measured by the force-controlled pushing device's force measuring part 35, between setting the pushing direction of the force-controlled pushing device 51 based on the position and/or orientation of the first object, a force-controlled pushing device movement command for moving the first object, or the position and/or orientation of the movement mechanism part of the force-controlled pushing device 51, and setting the pushing direction of the force-controlled pushing device 51 based on the position, orientation, or position and orientation of the robot 50, or the robot movement command.

Based on the force, which acts between the first object and the second object, measured by the force-controlled pushing device's force measuring part 35, if the force in the pushing direction is less than a predetermined threshold value, the fact that the portion of the workpiece 53, with which the tool 52 is in contact, has, for example, a recess (valley), and accordingly, they are separated from or tend to be easily separated from each other is determined, or, if a method for setting a pushing direction based on the position and/or orientation of the first object is performed, the fact that the method makes the pushing direction inappropriate is determined. Further, based on the force, which acts between the first object and the second object, measured by the force-controlled pushing device's force measuring part 35, if a force exceeding a predetermined threshold value is applied, in a direction other than the pushing direction, between the first object and the second object, the fact that the portion of the workpiece 53, with which the tool 52 is in contact, has a protrusion, and accordingly, they do not match each other, or an overload tends to be applied to the portion, or, if a method for setting a pushing direction based on the position and/or orientation of the first object is performed, the fact that the method makes the pushing direction inappropriate is determined.

The force-controlled pushing device's pushing direction setting part 33 determines that, in the protrusion (ridge), the recess (valley), or a large uneven portion, in which, as described above, the tool 52 and the workpiece 53 are hard to come into appropriate contact with each other, and are separated from or tend to be easily separated from each other, or an overload tends to be applied thereto, it is difficult to cause the tool 52 and the workpiece 53 to be in appropriate contact with each other, based on the information regarding the position and/or orientation of the first object, or the position and/or orientation of the tool 52 and the workpiece 53, which are in contact, and sets a pushing direction based on the position and/or orientation of the robot 50 moved/operated by the operator 56 or the position and/or orientation or moving direction of the robot 50 on the basis of the robot movement command.

The force-controlled pushing device's pushing direction setting part 33 determines that, in the portion other than the protrusion (ridge), the recess (valley), or a large uneven portion, in which, as described above, the tool 52 and the workpiece 53 are hard to come into appropriate contact with each other, and are separated from or tend to be easily separated from each other, or an overload tends to be applied thereto, it is difficult to cause the tool 52 and the workpiece 53 to be in appropriate contact with each other, based on the information regarding the position and/or orientation of the tool 52 and the workpiece 53, which are in contact, and sets a pushing direction based on the position and/or orientation of the first object, the movement command for the force-controlled pushing device 51, or the position and/or orientation of the force-controlled pushing device 51 in the system reference coordinate system.

As seen above, the force-controlled pushing device's pushing direction setting part 33 sets a pushing direction based on the force acting between the first object and the second object, so that, in the movement/operation of the robot 50, the first object and the second object can be moved relative to each other so as not to be separated, and so as to be in contact with each other by a more appropriate force.

As seen above, according to the sixth embodiment, the fact that, for example, the portion of the workpiece, with which the tool comes into contact, has a large protrusion or recess, or a corner, or the current pushing direction of the force-controlled pushing device is inappropriate is determined based on the force measured by the force-controlled pushing device's force measuring part, and a determination based on the position and/or orientation along the outline of the workpiece and a determination based on the direction of the movement/operation of the robot can be switched by switching between a mode for setting a pushing direction based on the position and/or orientation of the first object, the movement command for the force-controlled pushing device, and the position and orientation of the force-controlled pushing device, and a mode for setting a pushing direction based on the position and/or orientation of the robot and the movement command for the robot, and thus, the pushing direction can be set so that the tool and the workpiece come into appropriate contact with each other.

In the seventh embodiment of this disclosure, a description of a part of the configuration and function of the robot system 11, which overlaps with that of the robot systems 11 according to the first to third embodiments, is omitted. Further, a description of the configuration and function, which are similar to those described in the other embodiments, is omitted.

According to the robot system 11 in the seventh embodiment of this disclosure, in any one of the first to third robot systems 11, the force-controlled pushing device's pushing direction setting part 33 calculates, based on the force measured by the force-controlled pushing device's force measuring part 35, under a first condition (in which the force in a direction other than the pushing direction exceeds a threshold value, or the force in the pushing direction is less than a predetermined threshold value), a direction making a predetermined angle (with the moving direction of the robot 50 based on a plurality of positions of the robot 50, or the moving direction of the robot 50 based on the robot movement command), and set the direction as the pushing direction of the force-controlled pushing device 51. The part 33 estimates, under a condition other than the first condition, based on a plurality of positions of the first object, the shape of the workpiece 53 with which the tool 52 comes into contact, and sets, as the pushing direction of the force-controlled pushing device 51, a direction making a predetermined angle with the shape of the workpiece 53.

The force-controlled pushing device's pushing direction setting part 33 first determines, based on the force measured by the force-controlled pushing device's force measuring part 35, that the portion of the workpiece 53, with which the tool 52 comes into contact, is a corner, or an uneven portion in which the tool 52 is hard to be in appropriate contact with the workpiece 53, or that the current pushing direction of the force-controlled pushing device 51 is inappropriate. Subsequently, in the case where the tool 52 and the workpiece 53 are moved relative to each other while they are in contact with each other, when, in a protruding wall or obstacle of the workpiece 53, at which the tool 52 and the workpiece 53 are hard to be in appropriate contact with each other, or a protrusion (ridge), along which the tool 53 does not follow, the force in a direction other than the pushing direction exceeds a predetermined threshold value, or under the aforementioned first condition in which, in a recess (valley) at which the tool 52 and the workpiece 53 are not in appropriate contact with and separated from each other, the force in the pushing direction is less than the predetermined threshold value, a direction making a predetermined angle with the moving direction of the robot 50 based on a plurality of positions of the robot 50 or the moving direction of the robot 50 based on the robot movement command is set as a pushing direction. Note that a plurality of positions of the robot 50 include, for example, the position of the robot 50 at a predetermined time, or the position of the robot 50 that has been moved by only a predetermined distance. The force-controlled pushing device's pushing direction setting part 33 estimates, under a condition other than the first condition, based on a plurality of positions of the first object, the shape of the portion of the workpiece 53, with which the tool 52 comes into contact, and sets, based on the estimated shape, a direction making a predetermined angle with the direction of the tangent to the portion of the workpiece 53, with which the tool 52 comes into contact or a direction given by a rough shape, as a pushing direction. Note that, in this respect, as in the setting method described in the fifth embodiment, the pushing direction is set. Further, the plurality of positions of the first object include, for example, the position of the first object at a predetermined time or the position of the first object that has been moved by only a predetermined distance. As seen above, the force-controlled pushing device's pushing direction setting part 33 sets a pushing direction based on the force acting between the first object and the second object. This enables, even in an uneven portion at which it is difficult to bring the tool 52 into appropriate contact with the workpiece 53, the first object and the second object to move relative to each other, in the movement/operation of the robot 50, so as not to be separated and so as to be in contact by a more appropriate force, by switching the method for setting the pushing direction.

As seen above, according to the seventh embodiment, even in an uneven portion at which it is difficult to bring the tool into appropriate contact with the workpiece, the first object and the second object can move relative to each other, in the movement/operation of the robot, so as to be in contact by a more appropriate force, by switching the method for setting the pushing direction based on the force acting between the first object and the second object.

In the eighth embodiment of this disclosure, a description of a part of the configuration and function of the robot system 11, which overlaps with that of the robot systems 11 according to the first to seventh embodiments, is omitted. Further, a description of the configuration and function, which are similar to those described in the other embodiments, is omitted.

According to the robot system 11 in the eighth embodiment of this disclosure, any one of the first to seventh robot systems 11 includes: the robot moving direction suitability determination part 37, which determines the suitability of the moving direction of the robot 50 based on the position, orientation, or position and orientation of the movement mechanism part of the force-controlled pushing device 51 in the operable range, or the position, orientation, or the position and orientation of the movement mechanism part of the force-controlled pushing device 51 in the operable range and the pushing direction of the force-controlled pushing device 51; and the robot moving direction suitability determination result output command part 38, which outputs, depending on the determination result of the robot moving direction suitability determination part 37, a command for displaying/outputting characters, numerical values, colors, pictures, codes, graphics, or patterns, a command for displaying/outputting the characters, numerical values, colors, pictures, codes, graphics, or patterns after changing the display cycle thereof, a command for outputting sounds, or a command for presenting/outputting vibrations, or outputs a command for adjusting the movement command for the robot 50, to the robot movement command calculating part 32, so that the robot movement command calculating part 32 outputs the determination result of the robot moving direction suitability determination part 37 by reducing the magnitude of the movement command for the robot 50 or reducing the same to zero.

The robot system 11 determines, when the movement mechanism part of the force-controlled pushing device 51 is located away from the center of the operable range or the reference position and/or orientation, the suitability of the moving direction of the robot 50, depending on the position and/or orientation of the movement mechanism part, and presents the state of the suitability of the moving direction. Thus, the operator 56 can easily move/operate the robot 50 so that the tool 52 and the workpiece 53 can be in more appropriate contact with each other. Further, the robot system 11 determines, based on the position and/or orientation in the operable range of the movement mechanism part of the force-controlled pushing device 51, and the pushing direction of the force-controlled pushing device 51, the suitability of the moving direction of the robot 50. Thus, the state of the force-controlled pushing device 51, which includes the position and/or orientation of the movement mechanism part as well as the pushing direction of the force-controlled pushing device 51, can be taken into consideration. The fact that the robot system 11 displays/presents the state of the suitability of the moving direction, enables the operator 56 to easily move/operate the robot 50 so that the tool 52 and the workpiece 53 can be in more appropriate contact with each other.

As seen above, according to the eighth embodiment, based on the position and/or orientation in the operable range of the movement mechanism part of the force-controlled pushing device, or based on the position and/or orientation in the operable range of the movement mechanism part of the force-controlled pushing device and the pushing direction of the force-controlled pushing device, the suitability of the moving direction of the robot is determined, and the state of the suitability of the moving direction is presented to the operator. Thus, the operator can move the robot so that the force-controlled pushing device can bring the tool into more appropriate contact with the workpiece. Further, the operability of the movement/operation of the robot, which is necessary when the force acting between the tool and the workpiece is caused to be appropriate, can be improved by causing the robot system to inform the operator with the suitability of the moving direction of the robot via, for example, a visual, hearing, or tactile sense so that the operator can easily understand the suitability, or by reducing the moving speed of the robot being moved/operated, or stopping the robot, so as to cause the operator to recognize the suitability of the moving direction of the robot. Further, the moving direction of the robot can be prevented from being an inappropriate direction, by reducing the moving speed of the robot or stopping the robot depending on the suitability of the moving direction of the robot.

In a ninth embodiment of this disclosure, a description of a part of the configuration and function of the robot system 11, which overlaps with that of the robot systems 11 according to the first to eighth embodiments, is omitted. Further, a description of the configuration and function, which are similar to those described in the other embodiments, is omitted.

According to the robot system 11 in the ninth embodiment of this disclosure, in any one of the first to eighth robot systems 11, the robot movement allowing direction setting part 39, which sets a robot movement allowing direction, i.e., a direction which allows the movement of the robot 50 in the movement/operation of the robot 50, is provided. The robot operation input measuring part 31 measures a robot operation input by measuring the force acting on the robot 50. The robot movement command calculating part 32 calculates a robot movement command based on the robot operation input measured by the robot operation input measuring part 31 and the robot movement allowing direction set by the robot movement allowing direction setting part 39. The force-controlled pushing device movement command calculating part 36 adjusts, based on the magnitude, sign, or magnitude and sign of the force acting on the robot 50, the magnitude of the force-controlled pushing device movement command, or switches the validity/invalidity of the movement of the force-controlled pushing device 51.

In the robot system 11 according to the ninth embodiment of this disclosure, the operator 56 applies a force to the robot 50 including a main body portion of the robot 50, which includes the tip end of the robot 50, an object, e.g., the robot guidance device 55 attached to the robot 50, and links and joints, which constitute the robot 50, so as to move/operate the robot 50.

Figure 12:
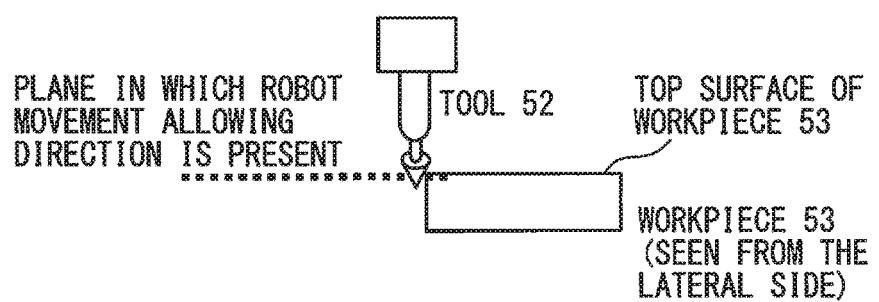
FIG. 12 is an explanatory view of a robot movement allowing direction.

The robot system 11 according to the ninth embodiment will be described with reference to FIG. 12. The robot movement allowing direction setting part 39 is present on a plane parallel to the top surface of the workpiece 53, and sets, as a robot movement allowing direction, a direction on the plane in which two perpendicular axes that constitute the movement mechanism part of the force-controlled pushing device 51 are present. Further, the moving direction of the force-controlled pushing device 51 is set to be on a plane parallel to the top surface of the workpiece 53. In this respect, the contact portion between the tool 52 and the workpiece 53 is present, due to the movement/operation of the robot 50 and the movement of the movement mechanism part of the force-controlled pushing device 51, on the plane in which the top surface of the workpiece 53 is present. In this respect, the force-controlled pushing device movement command calculating part 36 accelerates or decelerates, based on a force magnitude and a force sign representing the direction of the force in a direction perpendicular to the plane, in which the top surface of the workpiece 53 is present, in the force acting on the robot 50, the force-controlled pushing device 51 by switching between the validity/invalidity of the movement of the force-controlled pushing device 51, i.e., the force control mode and the position control mode, or by adjusting the magnitude of the force-controlled pushing device movement command. Further, the force-controlled pushing device movement command calculating part 36 accelerates or decelerates, based on a force magnitude and a force sign representing the direction of the force in a predetermined direction, i.e., one of the robot movement allowing directions in the force acting on the robot 50, the force-controlled pushing device 51 by switching between the validity/invalidity of the movement of the force-controlled pushing device 51, i.e., the force control mode and the position control mode, or by adjusting the magnitude of the force-controlled pushing device movement command.

This enables the operator 56 to change or modify the settings of the force-controlled pushing device 51 by a simple operation, i.e., an operation for changing the magnitude or direction of the force acting on the robot 50 in the movement/operation of the robot 50. Thus, the first object held by the force-controlled pushing device 51 and the second object can more easily be brought into appropriate contact with each other.

As seen above, according to the ninth embodiment, depending on the force acting in a direction perpendicular to the moving direction of the robot, the settings, e.g., motion speed or validity/invalidity of the force-controlled pushing device can be changed. Further, depending on the force acting in a predetermined direction, i.e., one of the robot movement allowing directions, the settings, e.g., motion speed or validity/invalidity of the force-controlled pushing device can be changed. In this way, changing, when applying a force to the robot so as to move the robot, the direction or magnitude of the force enables the motion of the force-controlled pushing device to be simply set, changed, or switched.

In a tenth embodiment of this disclosure, a description of a part of the configuration and function of the robot system 11, which overlaps with that of the robot systems 11 according to the first to ninth embodiments, is omitted. Further, a description of the configuration and function, which are similar to those described in the other embodiments, is omitted.

According to the robot system 11 in the tenth embodiment of this disclosure, in any one of the first to ninth robot systems 11, there is provided a robot motion program generating part 40 for generating a motion program for the robot 50 based on the position, orientation, or position and orientation of the first object, which are obtained when the robot 50 and the force-controlled pushing device 51 are moved. The robot motion program generating part 40 generates a motion program for the robot 50, so that the position, orientation, or position and orientation of the first object, which are obtained when the force acting between the first object and the second object is not less than a predetermined threshold value, correspond to the reference position, orientation, or position and orientation with respect to the force-controlled pushing device 51.

The robot motion program generating part 40 obtains the position and/or orientation of the first object, when, based on the force acting between the tool 52 and the workpiece 53, which is measured by the force-controlled pushing device's force measuring part 35, the fact that the tool 52 and the workpiece 53 are in contact with, or in appropriate contact with each other is determined, e.g., when the force acting between the tool 52 and the workpiece 53 is not less than a predetermined threshold value, or when a pushing-direction force in the force acting between the tool 52 and the workpiece 53 is not less than a predetermined threshold value. Then, the robot motion program generating part 40 generates a motion program for the robot 50 so that the obtained position and/or orientation of the first object correspond to the reference position and/or orientation of the force-controlled pushing device 51. Note that the reference position and/or orientation do not necessarily have to correspond to the center of the operable range of the force-controlled pushing device 51, and preferably correspond to the position and/or orientation, in which the manageable deviation in the position and/or orientation until the first object and the second object come into contact with each other can be set to be as large as possible.

This enables, when the robot 50 is moved based on the generated motion program for the robot 50, the tool 52 and the workpiece 53 to be moved relative to each other while the position and/or orientation of the tool 52 and the workpiece 53, which are in contact with or close to each other, are maintained. Further, when using the generated motion program for the robot 50 so as to move the robot 50 causes the force-controlled pushing device 51 to move the first object so that an appropriate force is applied between the first object and the second object while the robot 50 which is not moved/operated by the operator 56 is automatically driven, the amount of movement of the movement mechanism part of the force-controlled pushing device 51 can be reduced, and the tool 52 and the workpiece 53 can more easily be brought into appropriate contact with each other.

As seen above, according to the tenth embodiment, the position and/or orientation of the first object when the first object and the second object are in appropriate contact with each other is obtained based on the force acting between the first object and the second object. Further, when the movement mechanism part of the force-controlled pushing device is present at the position and/or orientation of the center of the force-controlled pushing device or at the reference position and/or orientation, a motion program for the robot, which moves the robot so that the position and/or orientation of the first object is present at the obtained position and/or orientation, is generated and taught. Moving the robot using this motion program for the robot causes the movement mechanism part of the force-controlled pushing device to be close to the center of the operable range or the reference position, or causes the moving range of the movement mechanism part of the force-controlled pushing device to be widened. Thus, the workpiece and the tool can be brought into appropriate contact with each other, and moved relative to each other.

In an eleventh embodiment of this disclosure, a description of a part of the configuration and function of the robot system 11, which overlaps with that of the robot systems 11 according to the first to eighth embodiments, is omitted. Further, a description of the configuration and function, which are similar to those described in the other embodiments, is omitted.

According to the robot system 11 in the eleventh embodiment of this disclosure, in any one of the first to eighth robot systems 11, the robot motion program generating part 40, which generates a motion program for the robot 50 based on the position, orientation, or position and orientation of the first object, which are obtained when the robot 50 and the force-controlled pushing device 51 are moved, and the robot movement allowing direction setting part 39, which sets a robot movement allowing direction, i.e., a direction for allowing the movement of the robot 50 in the movement/operation of the robot 50, are provided. The robot operation input measuring part 31 measures a robot operation input by measuring the force acting on the robot 50. The robot motion program generating part 40 obtains the position, orientation, or position and orientation of the first object, when the magnitude, sign, or magnitude and sign of the force acting on the robot 50 in a direction perpendicular to the robot movement allowing direction, or in a predetermined direction, i.e., one of the robot movement allowing directions are under a predetermined condition, and then, generates a motion program for the robot 50 based on the obtained position, orientation, or position and orientation of the first object.

In the robot system 11 according to the eleventh embodiment of this disclosure, the operator 56 applies a force to the robot 50 including, for example, the tip end of the robot 50, an object, such as the robot guidance device 55 attached to the robot 50, links of the robot 50, etc., so as to move/operate the robot 50.

The robot system 11 according to the eleventh embodiment will be described with reference to FIG. 12. The robot movement allowing direction setting part 39 is present on a plane parallel to the top surface of the workpiece 53, and sets, as a robot movement allowing direction, a direction in the plane in which two perpendicular axes, which constitute the movement mechanism part of the force-controlled pushing device 51, are present. Further, the moving direction of the force-controlled pushing device 51 is set to be on the plane parallel to the top surface of the workpiece 53. In this respect, the contact portion between the tool 52 and the workpiece 53 is present, due to the movement/operation of the robot 50 and the movement of the movement mechanism part of the force-controlled pushing device 51, on the plane in which the top surface of the workpiece 53 is present. In this respect, the robot motion program generating part 40 obtains, under a predetermined condition, the position and/or orientation of the first object, based on a force magnitude and a force sign representing the direction of the force in a direction perpendicular to the plane, in which the top surface of the workpiece 53 is present, in the force acting on the robot 50, or a force magnitude and a force sign representing the direction of the force in a predetermined direction, i.e., one of the robot movement allowing directions in the force acting on the robot 50, and then, a motion program for the robot 50 based on the obtained position and/or orientation of the first object.

The predetermined condition is, for example, a condition in which the magnitude of the force is not less than a predetermined threshold value. Alternatively, the condition may be a predetermined condition based on a change between positive and negative values, e.g., a condition in which the force sign is either positive or negative, a condition in which the force sign that has been positive in a predetermined period of time is tuned into negative in another predetermined period of time, or a condition in which the force sign that has been positive in a predetermined period of time is turned into negative in another predetermined period of time, and then, is turned into positive in still another predetermined period of time. Alternatively, the condition may be a condition in which, based on the magnitude or sign of the force, for example, the magnitude of the force is not less than a predetermined threshold value, the force sign is the designated one of positive and negative values.

This enables the operator 56 to obtain the position and/or orientation to be taught, by a simple operation, i.e., an operation for changing the magnitude or direction of the force acting on the robot 50 in the movement/operation of the robot 50, so as to generate a motion program for the robot.

As seen above, according to the eleventh embodiment, when a force is applied to the robot so as to move/operate the robot, the position and/or orientation of the first object is obtained depending on the magnitude or sign of the force acting in a direction perpendicular to the moving direction of the robot, or depending on the magnitude or sign of the force acting in a predetermined direction, i.e., one of the robot movement allowing directions, so as to generate and teach a motion program for the robot. Thus, the motion program for the robot can be made by a simple operation. Further, moving the robot using this motion program for the robot causes the movement mechanism part of the force-controlled pushing device to be close to the center of the operable range or the reference position, or causes the moving range of the movement mechanism part of the force-controlled pushing device to be widened. Thus, the workpiece and the tool can be brought into appropriate contact with each other, and moved relative to each other.

In a twelfth embodiment of this disclosure, a description of a part of the configuration and function of the robot system 11, which overlaps with that of the robot systems 11 according to the first to eleventh embodiments, is omitted. Further, a description of the configuration and function, which are similar to those described in the other embodiments, is omitted.

According to the robot system 11 according to the twelfth embodiment of this disclosure, in any one of the first to eleventh robot systems 11, the robot movement command calculating part 32 reduces the amount of movement in the robot movement command, or reduces the same into zero, regarding some of the directions other than the pushing direction of the force-controlled pushing device 51, in which the force exceeding a predetermined threshold value is applied, in the force acting between the first object and the second object.

Thus, when the robot 50 is moved, if a force, which exceeds a predetermined threshold value, is applied in a direction other than the pushing direction between the tool 52 and the workpiece 53, the amount of movement of the robot 50 is reduced, or the robot 50 is prevented from moving in that direction. Thus, the tool 52 or the workpiece 53 can be prevented from further moving in a direction in which an overload is applied to itself, and its movement in a direction, in which an inappropriate force is applied, can be stopped.

As seen above, according to the twelfth embodiment, when the robot is moved, if a force, which exceeds a predetermined threshold value, is applied in a direction other than the pushing direction between the tool and the workpiece, the amount of movement of the robot is reduced, or the robot is prevented from moving in that direction. Thus, the tool or the workpiece can be prevented from further moving in a direction in which an overload is applied to itself, and its movement in a direction, in which an inappropriate force is applied, can be stopped. This enables the safety of the movement/operation of the robot to be improved.

In a thirteenth embodiment of this disclosure, a description of a part of the configuration and function of the robot system 11, which overlaps with that of the robot systems 11 according to the first to twelfth embodiments, is omitted. Further, a description of the configuration and function, which are similar to those described in the other embodiments, is omitted.

According to the robot system 11 in the thirteenth embodiment of this disclosure, in any one of the first to twelfth robot systems 11, the movement of the robot 50 is stopped when the force acting between the first object and the second object is not less than a predetermined threshold value, and the movement mechanism part of the force-controlled pushing device 51 is present, in relation to a direction opposite to the pushing direction, at a position within a limit range of the operable range of the movement mechanism part of the force-controlled pushing device 51, or within a predetermined value from the limit range.

When the force-controlled pushing device 51 controls the force acting between the first object and the second object in the pushing direction, and the movement mechanism part of the force-controlled pushing device 51 is present, in relation to a direction opposite to the pushing direction, at a position within a limit range in the operable range of the movement mechanism part of the force-controlled pushing device 51, or within a predetermined value from the limit range, the movement mechanism part of the force-controlled pushing device 51 moves in a direction opposite to the pushing direction, and reaches the boundary of the operable range of the movement mechanism part of the force-controlled pushing device 51, and then, the status, in which it is difficult to control the force acting between the first object and the second object, is almost achieved, and an overload, which exceeds a predetermined threshold value, is applied between the first object and the second object. Thus, it is preferable that the movement/operation of the robot 50 is stopped. This avoids, when the operator 56 moves/operates the robot 50 so as to move the first and second objects relative to each other and contact the first object and the second object, an overload from being applied to the robot 50, the force-controlled pushing device 51, the tool 52, or the workpiece 53.

As seen above, according to the thirteenth embodiment, the movement of the robot is stopped when the movement mechanism part of the force-controlled pushing device moves, and is present within the limit range of the operable range of the force-controlled pushing device or a predetermined value from the limit range, and the force acting between the tool and the workpiece is not less than a predetermined threshold value, and thus, an excessive force is avoided from acting between the tool and the workpiece.

In a fourteenth embodiment of this disclosure, a description of a part of the configuration and function of the robot system 11, which overlaps with that of the robot systems 11 according to the first to thirteenth embodiments, is omitted. Further, a description of the configuration and function, which are similar to those described in the other embodiments, is omitted.

According to the robot system 11 in the fourteenth embodiment of this disclosure, any one of the first to thirteenth robot systems 11 includes: the pushing state suitability determination part 41, which determines, based on the force acting between the first object and the second object, the suitability of the pushing state between the first object and the second object; and a pushing state suitability determination result output command part, which outputs, depending on the determination result of the pushing state suitability determination part 41, a command for displaying/outputting characters, numerical values, colors, pictures, codes, graphics, or patterns, a command for displaying/outputting the characters, numerical values, colors, pictures, codes, graphics, or patterns after changing the display cycle of the same, a command for outputting sounds, or a command for presenting/outputting vibrations, or outputs a command for adjusting the movement command for the robot 50, to the robot movement command calculating part 32, so that the robot movement command calculating part 32 outputs the determination result of the pushing state suitability determination part 41 by reducing the magnitude of the movement command for the robot 50 or reducing the same to zero.

This enables the operator 56 to know, during the movement/operation of the robot 50, the pushing state between the first object and the second object, and causes, in the movement/operation of the robot 50, the first object and the second object to tend to more appropriately move.

As seen above, according to the fourteenth embodiment, the operability of the movement/operation of the robot, which is necessary when the force acting between the tool and the workpiece is caused to be appropriate, can be improved by causing the robot system to inform the operator with the suitability of the moving direction of the robot via, for example, a visual, hearing, or tactile sense so that the operator can easily understand the suitability, or by reducing the moving speed of the robot being moved/operated, or stopping the robot, so as to cause the operator to recognize the suitability of the moving direction of the robot. Further, the pushing state can be prevented from being an inappropriate state, by reducing the moving speed of the robot or stopping the robot depending on the suitability of the pushing state between the tool and the workpiece.

In a fifteenth embodiment of this disclosure, a description of a part of the configuration and function of the robot system 11, which overlaps with that of the robot systems 11 according to the first to eighth, tenth, twelfth to fourteenth embodiments, is omitted. Further, a description of the configuration and function, which are similar to those described in the other embodiments, is omitted.

According to the robot system 11 in the fifteenth embodiment of this disclosure, in any one of the first to eighth, tenth, twelfth to fourteenth robot systems 11, the robot operation input measuring part 31 measures a force acting on the main body portion of the robot 50, or measures a robot operation input for moving/operating the robot 50 by measuring a force acting on the tip end of the force acting on the robot 50. Alternatively, the robot system 11 in the fifteenth embodiment of this disclosure further includes the robot guidance device 55, and the robot operation input measuring part 31 measures a force acting on the robot guidance device 55 attached to the robot 50. Alternatively, the robot system 11 in the fifteenth embodiment of this disclosure further includes a non-contact robot guidance device 55a, and measures a robot operation input for moving/operating the robot 50 by measuring an input given by the non-contact robot guidance device 55a.

Applying a force to the robot 50 including the tip end or main body portion of the robot 50, and devices attached to the robot 50, so as to give a robot operation input for moving/operating the robot 50 enables the robot 50 to be moved/operated at a position closer to the robot 50, by a direct operating sense. Further, causing the robot operation input measuring part 31 to measure a force acting on the robot 50, and comparing the force measured by the robot operation input measuring part 31 with the force measured by the force-controlled pushing device's force measuring part 35 enables a determination of, for example, whether there is a large difference between the values measured by the robot operation input measuring part 31 and the force-controlled pushing device's force measuring part 35, whether the value measured by any of the measuring parts is abnormal, or whether a device, such as a sensor for measuring/estimating a force, breaks down.

Further, measuring an input given by the non-contact robot guidance device enables the operator 56 to safely move/operate the robot 50 at a convenient position away from the robot 50.

As seen above, according to the fifteenth embodiment, measuring a force acting on the robot guidance device, e.g., a handle attached to the robot enables an unintended measurement of a force to be avoided, and the operation input for moving the robot to be more appropriately detected in accordance with an operational feeling of the operator. Thus, the robot can be more appropriately moved just as the operator intended. If the robot guidance device is set to fulfil a plurality of functions, the other functions can be easily performed. When a force acting on the main body portion of the robot is measured, the operator can move the robot even by applying a force to not only a specific portion of the robot but also any other portions of the robot main body. In this instance, the force acting on the main body portion of the robot is measured, and accordingly, the operator applies a force to the main body portion of the robot so that the links and axes of the robot can be moved to desired positions. Further, measuring a force acting on the tip end of the robot enables the operator to move the tip end of the robot to a desired position and/or orientation. Further, measuring a force acting on the tip end of the robot so as to compare the force with the measured result of the force-controlled pushing device's force measuring part enables a failure of the measuring part to be detected, and the measuring accuracy of the measuring part to be improved. Further, measuring a force in a direction that cannot be measured by the force-controlled pushing device's force measuring part enables a detection of the fact that a force acting between the workpiece and the tool is inappropriate. The fact that the robot can be moved by an input given by the non-contact robot guidance device enables the robot to be safely moved/operated from a position away from the robot.

According to an embodiment of the present disclosure, the pushing direction of the force-controlled pushing device is set depending on a moving status of at least any of the first object, the force-controlled pushing device, and the robot. Thus, during the movement/operation of the robot, the tool and the workpiece can be moved relative to each other while being in contact so as not to be away from each other, by a simple movement/operation, such as an operation for roughly moving the robot. Further, during the movement/operation of the robot, the force-controlled pushing device rapidly moves the first object in comparison with the case where only the robot moves the first object, and moves the first object in an appropriate pushing direction. Thus, even when the relative speed between the tool and the workpiece is increased, the tool and the workpiece can be in appropriate contact with each other by a predetermined force. Further, even in the case where the robot moves in a vibrating manner, the case where the control state of the robot is unstable, the case where the orbit is corrected so as to avoid the vicinity of a singular posture, the case where the moving motion of the robot is deviated from the taught orbit due to, for example, the avoidance of collision or interference with a surrounding stuff or person, or the case where the moving motion of the robot caused by the operator is not very appropriate, the force-controlled pushing device controls a force, and accordingly, the force acting between the tool and the workpiece can be appropriately controlled.

According to another embodiment of the present disclosure, the amount of movement in the movement command for the robot is adjusted, depending on the state of the force-controlled pushing device, based on at least one of the position, orientation, or position and orientation in the operable range of the movement mechanism part of the force-controlled pushing device, the pushing direction of the force-controlled pushing device, or the force measured by the force-controlled pushing device's force measuring part. Thus, in the case where the status, in which it is difficult to contact the tool and the workpiece, is avoided, or it is difficult to cause the force-controlled pushing device to control a force, or the case where an excessive force is applied, the moving status of the robot is adjusted so as to appropriately control the force acting between the tool and the workpiece, or so as to avoid a dangerous condition if at all possible. Further, even in the case where the robot moves in a vibrating manner, the case where the control state of the robot is unstable, the case where the orbit is corrected so as to avoid the vicinity of a singular posture, the case where the moving motion of the robot is deviated from the taught orbit due to, for example, the avoidance of collision or interference with a surrounding stuff or person, or the case where the moving motion of the robot caused by the operator is not very appropriate, the force-controlled pushing device controls a force, and accordingly, the force acting between the tool and the workpiece can be appropriately controlled.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot system for causing a robot and a force-controlled pushing device provided at a tip end of the robot to control a force acting between a tool and a workpiece, so as to move the tool and the workpiece relative to each other, wherein the robot system comprises:

the robot;

the force-controlled pushing device comprising a movement mechanism part, which holds a first object being one of the tool and the workpiece, and moves the first object by controlling a force acting between the first object and a second object being the other of the tool and the workpiece, so as to push the first object, in a predetermined pushing direction, by a predetermined target pushing force;

a robot operation input measuring part for measuring a robot operation input for moving/operating the robot;

a robot movement command calculating part for calculating, based on the robot operation input measured by the robot operation input measuring part, a robot movement command being a movement command for the robot;

a force-controlled pushing device's pushing direction setting part for setting the pushing direction of the force-controlled pushing device;

a force-controlled pushing device's target pushing force setting part for setting the target pushing force of the force-controlled pushing device;

a force-controlled pushing device's force measuring part for measuring a force acting between the tool and the workpiece; and a force-controlled pushing device movement command calculating part for calculating, based on the pushing direction set by the force-controlled pushing device's pushing direction setting part, the target pushing force set by the force-controlled pushing device's target pushing force setting part, and a force measured by the force-controlled pushing device's force measuring part, a force-controlled pushing device movement command being a movement command for the movement mechanism part of the force-controlled pushing device, wherein the force-controlled pushing device's pushing direction setting part sets a pushing direction of the force-controlled pushing device, based on at least one of the position, orientation, or position and orientation of the first object, the force-controlled pushing device movement command for moving the first object, the position, orientation, or position and orientation of the movement mechanism part of the force-controlled pushing device, the position, orientation, or position and orientation of the robot, or the robot movement command for moving the robot, and either (i) or (ii) below
  (i) the robot operation input measuring part measures the robot operation input for moving/operating the robot by measuring a force acting on a main body portion of the robot, or a force acting on a tip end of the robot,
  (ii) the robot system further comprises a robot guidance device, and the robot operation input measuring part measures the robot operation input for moving/operating the robot by measuring a force acting on the robot guidance device attached to the robot, or an input given by a non-contact robot guidance device.

2. A robot system for causing a robot and a force-controlled pushing device provided at a tip end of the robot to control a force acting between a tool and a workpiece, so as to move the tool and the workpiece relative to each other, wherein the robot system comprises:
the robot;
the force-controlled pushing device comprising a movement mechanism part, which holds a first object being one of the tool and the workpiece, and moves the first object by controlling a force acting between the first object and a second object being the other of the tool and the workpiece, so as to push the first object, in a predetermined pushing direction, by a predetermined target pushing force;
a robot operation input measuring part for measuring a robot operation input for moving/operating the robot;
a robot movement command calculating part for calculating, based on the robot operation input measured by the robot operation input measuring part, a robot movement command being a movement command for the robot;
a force-controlled pushing device's pushing direction setting part for setting the pushing direction of the force-controlled pushing device;
a force-controlled pushing device's target pushing force setting part for setting the target pushing force of the force-controlled pushing device;

a force-controlled pushing device's force measuring part for measuring a force acting between the tool and the workpiece; and a force-controlled pushing device movement command calculating part for calculating, based on the pushing direction set by the force-controlled pushing device's pushing direction setting part, the target pushing force set by the force-controlled pushing device's target pushing force setting part, and a force measured by the force-controlled pushing device's force measuring part, a force-controlled pushing device movement command being a movement command for the movement mechanism part of the force-controlled pushing device, wherein the robot movement command calculating part adjusts the amount of movement in the robot movement command, or prevents the robot from moving, based on at least one of the position, orientation, or position and orientation of in an operable range of the movement mechanism part of the force-controlled pushing device, the pushing direction set by the force-controlled pushing device's pushing direction setting part, or a force measured by the force-controlled pushing device's force measuring part, and either (i) or (ii) below
  (i) the robot operation input measuring part measures the robot operation input for moving/operating the robot by measuring a force acting on a main body portion of the robot, or a force acting on a tip end of the robot,
  (ii) the robot system further comprises a robot guidance device, and the robot operation input measuring part measures the robot operation input for moving/operating the robot by measuring a force acting on the robot guidance device attached to the robot, or an input given by a non-contact robot guidance device.

3. The robot system according to claim 1, wherein
the movement mechanism part moves the first object by controlling the force acting between the first object and the second object so as to push the first object, in the predetermined pushing direction set by the force-controlled pushing device's pushing direction setting part, by the predetermined target pushing force, and to push, in relation to one direction perpendicular to the predetermined pushing direction or two directions which are perpendicular to the predetermined pushing direction and are perpendicular to each other, the first object by an around-axis target pushing force being a predetermined force around an axis in the one direction or in each of the two directions,
the force-controlled pushing device's target pushing force setting part sets the target pushing force and the around-axis target pushing force, and
the force-controlled pushing device movement command calculating part calculates, based on the pushing direction set by the force-controlled pushing device's pushing direction setting part, the target pushing force and the around-axis target pushing force, which are set by the force-controlled pushing device's target pushing force setting part, and a force measured by the force-controlled pushing device's force measuring part, the force-controlled pushing device movement command.

4. The robot system according to claim 1, wherein
the force-controlled pushing device's pushing direction setting part sets, as the pushing direction of the force-controlled pushing device, a predetermined direction depending on at least one of the position, orientation, or position and orientation of the first object, the force-controlled pushing device movement command for moving the first object, the position, orientation, or position and orientation of the movement mechanism part of the force-controlled pushing device, the moving direction of the first object, the position, orientation, or position and orientation of the robot, the robot movement command for moving the robot, or the moving direction of the robot.

5. The robot system according to claim 1, wherein the force-controlled pushing device's pushing direction setting part estimates, based on a plurality of positions of the first object, the shape of the portion of the workpiece, with which the tool is brought into contact, and sets, as the pushing direction of the force-controlled pushing device, a direction making a predetermined angle with the shape of the workpiece.

6. The robot system according to claim 1, wherein the force-controlled pushing device's pushing direction setting part switches, based on a force acting between the first object and the second object, which is measured by the force-controlled pushing device's force measuring part, between:
  setting, based on the position, orientation, or position and orientation of the first object, the force-controlled pushing device movement command for moving the first object, or the position, orientation, or position and orientation of the movement mechanism part of the force-controlled pushing device, the pushing direction of the force-controlled pushing device, and
  setting, based on the position, orientation, or position and orientation of the robot, or the robot movement command, the pushing direction of the force-controlled pushing device.

7. The robot system according to claim 1, wherein the force-controlled pushing device's pushing direction setting part:
  calculates, under a first condition in which, based on a force measured by the force-controlled pushing device's force measuring part, a force in a direction other than the pushing direction exceeds a threshold value, or a force in the pushing direction is less than a predetermined threshold value, a direction making a predetermined angle with the moving direction of the robot on the basis of a plurality of positions of the robot, or the moving direction of the robot on the basis of the robot movement command, and sets the calculated direction as the pushing direction of the force-controlled pushing device, and
  estimates, under a condition other than the first condition, a shape of the portion of the workpiece, with which the tool is brought into contact, based on the plurality of positions of the first object, and sets, as the pushing direction of the force-controlled pushing device, a direction making a predetermined angle with the shape of the workpiece.

8. The robot system according to claim 1, wherein the robot system further comprises:
a robot moving direction suitability determination part for determining the suitability of the moving direction of the robot, based on the position, orientation, or position and orientation in the operable range of the movement mechanism part of the force-controlled pushing device, or the position, orientation, or position and orientation in the operable range of the movement mechanism part of the force-controlled pushing device and the pushing direction of the force-controlled pushing device; and
a robot moving direction suitability determination result output command part, which outputs, depending on a determination result of the robot moving direction suitability determination part, a command for displaying/outputting characters, numerical values, colors, pictures, codes, graphics, or patterns, a command for displaying/outputting the characters, numerical values, colors, pictures, codes, graphics, or patterns after changing the display cycle thereof, a command for outputting sounds, or a command for presenting/outputting vibrations, or outputs a command for adjusting the movement command for the robot, to the robot movement command calculating part, so that the robot movement command calculating part outputs a determination result of the robot moving direction suitability determination part by reducing the magnitude of the movement command for the robot or reducing the same to zero.

9. A robot system for causing a robot and a force-controlled pushing device provided at a tip end of the robot to control a force acting between a tool and a workpiece, so as to move the tool and the workpiece relative to each other, wherein the robot system comprises:
  the robot;
  the force-controlled pushing device comprising a movement mechanism part, which holds a first object being one of the tool and the workpiece, and moves the first object by controlling a force acting between the first object and a second object being the other of the tool and the workpiece, so as to push the first object, in a predetermined pushing direction, by a predetermined target pushing force;
  a robot operation input measuring part for measuring a robot operation input for moving/operating the robot;
  a robot movement command calculating part for calculating, based on the robot operation input measured by the robot operation input measuring part, a robot movement command being a movement command for the robot;
  a force-controlled pushing device's pushing direction setting part for setting the pushing direction of the force-controlled pushing device;
  a force-controlled pushing device's target pushing force setting part for setting the target pushing force of the force-controlled pushing device;
  a force-controlled pushing device's force measuring part for measuring a force acting between the tool and the workpiece; and
  a force-controlled pushing device movement command calculating part for calculating, based on the pushing direction set by the force-controlled pushing device's pushing direction setting part, the target pushing force set by the force-controlled pushing device's target pushing force setting part, and a force measured by the force-controlled pushing device's force measuring part, a force-controlled pushing device movement command being a movement command for the movement mechanism part of the force-controlled pushing device, wherein
  the force-controlled pushing device's pushing direction setting part sets a pushing direction of the force-controlled pushing device, based on at least one of the position, orientation, or position and orientation of the first object, the force-controlled pushing device movement command for moving the first object, the position, orientation, or position and orientation of the movement mechanism part of the force-controlled pushing device, the position, orientation, or position and orientation of the robot, or the robot movement command for moving the robot, the robot system further comprises a robot movement allowing direction setting part for setting robot movement allowing directions being directions for allowing the movement of the robot in the movement/operation of the robot, the robot operation input measuring part measures the robot operation input by measuring a force acting on the robot, the robot movement command calculating part calculates the robot movement command, based on the robot operation input measured by the robot operation input measuring part, and the robot movement allowing direction set by the robot movement allowing direction setting part, the force-controlled pushing device movement command calculating part adjusts the magnitude of the force-controlled pushing device movement command, or switches the validity/invalidity of movement of the force-controlled pushing device, based on the magnitude, sign, or magnitude and sign of a force acting on the robot in a direction perpendicular to a predetermined one of the robot movement allowing directions, or a predetermined direction of the robot movement allowing directions, and the force-controlled pushing device is independent from components which constitute the robot, and is detachably attached to the robot.

10. The robot system according to claim 1, wherein the robot system further comprises a robot motion program generating part for generating a motion program for the robot, based on the position, orientation, or position and orientation of the first object, which are obtained when the robot and the force-controlled pushing device move, and the robot motion program generating part generates a motion program for the robot so that the position, orientation, or position and orientation of the first object, which are obtained when a force acting between the first object and the second object is not less than a predetermined threshold value, correspond to the reference position, orientation, or position and orientation with respect to the force-controlled pushing device.

11. A robot system for causing a robot and a force-controlled pushing device provided at a tip end of the robot to control a force acting between a tool and a workpiece, so as to move the tool and the workpiece relative to each other, wherein the robot system comprises:
the robot;
the force-controlled pushing device comprising a movement mechanism part, which holds a first object being one of the tool and the workpiece, and moves the first object by controlling a force acting between the first object and a second object being the other of the tool and the workpiece, so as to push the first object, in a predetermined pushing direction, by a predetermined target pushing force;
a robot operation input measuring part for measuring a robot operation input for moving/operating the robot;
a robot movement command calculating part for calculating, based on the robot operation input measured by the robot operation input measuring part, a robot movement command being a movement command for the robot;
a force-controlled pushing device's pushing direction setting part for setting the pushing direction of the force-controlled pushing device;
a force-controlled pushing device's target pushing force setting part for setting the target pushing force of the force-controlled pushing device;
a force-controlled pushing device's force measuring part for measuring a force acting between the tool and the workpiece; and
a force-controlled pushing device movement command calculating part for calculating, based on the pushing direction set by the force-controlled pushing device's pushing direction setting part, the target pushing force set by the force-controlled pushing device's target pushing force setting part, and a force measured by the force-controlled pushing device's force measuring part, a force-controlled pushing device movement command being a movement command for the movement mechanism part of the force-controlled pushing device, wherein the force-controlled pushing device's pushing direction setting part sets a pushing direction of the force-controlled pushing device, based on at least one of the position, orientation, or position and orientation of the first object, the force-controlled pushing device movement command for moving the first object, the position, orientation, or position and orientation of the movement mechanism part of the force-controlled pushing device, the position, orientation, or position and orientation of the robot, or the robot movement command for moving the robot, the robot system further comprises:
a robot motion program generating part for generating a motion program for the robot, based on the position, orientation, or position and orientation of the first object, which are obtained when the robot and the force-controlled pushing device move; and
a robot movement allowing direction setting part for setting robot movement allowing directions being directions for allowing the movement of the robot in the movement/operation of the robot, the robot operation input measuring part measures the robot operation input by measuring a force acting on the robot, and the robot motion program generating part obtains, when the magnitude, sign, or magnitude and sign of a force acting on the robot in a direction perpendicular to a predetermined one of the robot movement allowing directions, or in a predetermined direction of the robot movement allowing directions satisfy a predetermined condition, the position, orientation, or position and orientation of the first object, and generates a motion program for the robot, based on the obtained position, orientation, or position and orientation of the first object.

12. The robot system according to claim 1, wherein the robot movement command calculating part reduces the amount of movement in the robot movement command, or reduces the same to zero, in relation to a direction, in which a force exceeding a predetermined threshold value is applied in a direction other than the pushing direction in a force acting between the first object and the second object.

13. The robot system according to claim 1, wherein the robot system stops the movement of the robot, when a force acting between the first object and the second object is not less than a predetermined threshold value, and the movement mechanism part of the force-controlled pushing device is present, in relation to a direction opposite to the pushing direction, at a position in a limit range in the operable range of the movement mechanism part of the force-controlled pushing device, or within a predetermined value from the limit range.

14. The robot system according to claim 1, wherein the robot system further comprises:

a pushing state suitability determination part for determining, based on a force acting between the first object and the second object, the suitability of a pushing state between the first object and the second object; and a pushing state suitability determination result output command part, which outputs, depending on a determination result of the pushing state suitability determination part, a command for displaying/outputting characters, numerical values, colors, pictures, codes, graphics, or patterns, a command for displaying/outputting the characters, numerical values, colors, pictures, codes, graphics, or patterns after changing the display cycle thereof, a command for outputting sounds, or a command for presenting/outputting vibrations, or outputs a command for adjusting the movement command for the robot, to the robot movement command calculating part, so that the robot movement command calculating part outputs a determination result of the pushing state suitability determination part by reducing the magnitude of the movement command for the robot or reducing the same to zero.

* * * * *